(12) United States Patent
Hauser

(10) Patent No.: US 11,284,614 B1
(45) Date of Patent: Mar. 29, 2022

(54) ADJUSTABLE BRACKET FOR SECURING TREE STANDS TO TREE TRUNKS

(71) Applicant: Aaron Hauser, Greene, IA (US)

(72) Inventor: Aaron Hauser, Greene, IA (US)

( * ) Notice: Subject to any disclaimer, the term of this patent is extended or adjusted under 35 U.S.C. 154(b) by 439 days.

(21) Appl. No.: 16/261,269

(22) Filed: Jan. 29, 2019

Related U.S. Application Data

(60) Provisional application No. 62/623,778, filed on Jan. 30, 2018.

(51) Int. Cl.
*A01M 31/02* (2006.01)
*F16M 13/02* (2006.01)

(52) U.S. Cl.
CPC .......... *A01M 31/02* (2013.01); *F16M 13/022* (2013.01)

(58) Field of Classification Search
CPC .............................. A01M 31/02; F16M 13/022
See application file for complete search history.

(56) References Cited

U.S. PATENT DOCUMENTS

| | | | |
|---|---|---|---|
| 4,018,301 A * | 4/1977 | Nameche | E06C 1/34 |
| | | | 182/206 |
| 4,464,440 A | 8/1984 | Dotzman | |
| 4,717,626 A | 1/1988 | Badger | |
| 4,946,004 A * | 8/1990 | Henson | E06C 1/34 |
| | | | 182/107 |
| 4,971,865 A | 11/1990 | Nowlan | |
| 5,009,283 A | 4/1991 | Prejean | |
| 5,060,756 A | 10/1991 | D'Acquisto | |
| 5,105,532 A | 4/1992 | Fritsch | |
| 5,131,496 A | 7/1992 | White | |
| D355,390 S | 2/1995 | Culbertson | |
| 5,439,074 A | 8/1995 | Trout et al. | |
| 5,472,765 A | 12/1995 | Green | |
| 5,476,241 A | 12/1995 | Helman | |
| 5,482,137 A | 1/1996 | McNeill | |
| D369,640 S | 5/1996 | Woody, II | |
| 5,518,083 A | 5/1996 | Blennert | |
| 6,571,916 B1 * | 6/2003 | Swanson | A01M 31/02 |
| | | | 108/152 |

(Continued)

*Primary Examiner* — Colleen M Chavchavadze
(74) *Attorney, Agent, or Firm* — McKee, Voorhees & Sease, PLC

(57) ABSTRACT

An apparatus, system, and method of attaching a tree stand or other structure along a tree trunk. The apparatus includes a plurality of independently operable features that can be used together or by-themselves with a backbone-type base. The base can support a seat, foot rest, combination of the same, or other structures. One of the independently operable features is a cross member or beam that rotates at the backbone. This can adjust to a tree trunk that diverges to one side or the other from vertical and from the backbone. Another feature is a second cross member that nest in or pivot at one end out of the primary cross beam. This can adjust to a tree trunk that diverges away from the backbone. Another feature is a combination V- or C-shaped cleats or claws and spaced apart around separate vertical pivot axes, with concave sides towards the trunk, at the cross-beam or beams. One cleat is wider and fixed. This assists in gripping a tree trunk that is crooked either side-to-side relative the backbone or diverges away from the backbone and vertical. These features can assist in plumbing a backbone relative to vertical regardless of tree trunk shape at the area of mounting.

18 Claims, 23 Drawing Sheets

(56) References Cited

U.S. PATENT DOCUMENTS

| | | |
|---|---|---|
| 6,828,035 B1 | 12/2004 | Goettl |
| 7,152,358 B1 | 12/2006 | LeAnna et al. |
| 7,243,888 B2 | 7/2007 | Peek |
| 7,963,368 B2 * | 6/2011 | Scudera .................. A63B 27/00 182/116 |
| 8,011,476 B1 * | 9/2011 | Alcon ....................... E06C 1/36 182/206 |
| 8,201,793 B1 | 6/2012 | Powell et al. |
| 8,230,972 B2 * | 7/2012 | Johnson ................ A01M 31/02 182/187 |
| 8,251,455 B1 | 8/2012 | Midkiff et al. |
| 8,292,033 B2 * | 10/2012 | Hale ...................... A01M 31/02 182/187 |
| 8,522,920 B1 * | 9/2013 | Salyer ................... A01M 31/02 182/188 |
| 8,708,592 B1 * | 4/2014 | Gardner ................ A01M 31/02 403/53 |
| 9,027,709 B2 * | 5/2015 | Wheelington ........ A01M 31/02 182/129 |
| 9,204,628 B2 | 12/2015 | Priest |
| 9,332,748 B2 * | 5/2016 | Brown ................ A62B 35/0037 |
| 9,743,774 B1 | 8/2017 | Hauser |
| 9,938,734 B1 * | 4/2018 | Garis ...................... E04G 5/067 |
| 10,415,311 B2 * | 9/2019 | Parker ....................... E06C 1/34 |
| 10,524,467 B1 * | 1/2020 | Garis .................... A01M 31/02 |
| 10,757,929 B1 * | 9/2020 | Hauser .................... A47C 7/029 |
| 10,798,937 B2 * | 10/2020 | Berry .................... A01M 31/02 |
| 2002/0112919 A1 | 8/2002 | Graham, Jr. |
| 2006/0038434 A1 | 2/2006 | Howell et al. |
| 2008/0169156 A1 * | 7/2008 | Leishman ............. A01M 31/02 182/187 |
| 2009/0230260 A1 | 9/2009 | Damin |
| 2009/0321186 A1 | 12/2009 | Louchart |
| 2010/0223832 A1 | 9/2010 | Lombardi |
| 2010/0314514 A1 * | 12/2010 | Nelson ................... F16M 11/08 248/219.1 |
| 2011/0031363 A1 | 2/2011 | Shaw |
| 2011/0226553 A1 * | 9/2011 | Ekes, II ................ A01M 31/02 182/188 |
| 2011/0297481 A1 * | 12/2011 | Copus ................... A01M 31/02 182/113 |
| 2013/0186310 A1 | 7/2013 | Lymberis |
| 2013/0257121 A1 | 10/2013 | Otta |
| 2014/0131137 A1 | 5/2014 | Bassett |
| 2014/0138185 A1 * | 5/2014 | Samona ................ A01M 31/02 182/187 |
| 2014/0262620 A1 | 9/2014 | Musco |
| 2014/0311828 A1 | 10/2014 | Bassett et al. |
| 2017/0265454 A1 | 9/2017 | Kramer |
| 2018/0310546 A1 | 11/2018 | Pope |
| 2019/0055782 A1 | 2/2019 | Infalt et al. |

* cited by examiner

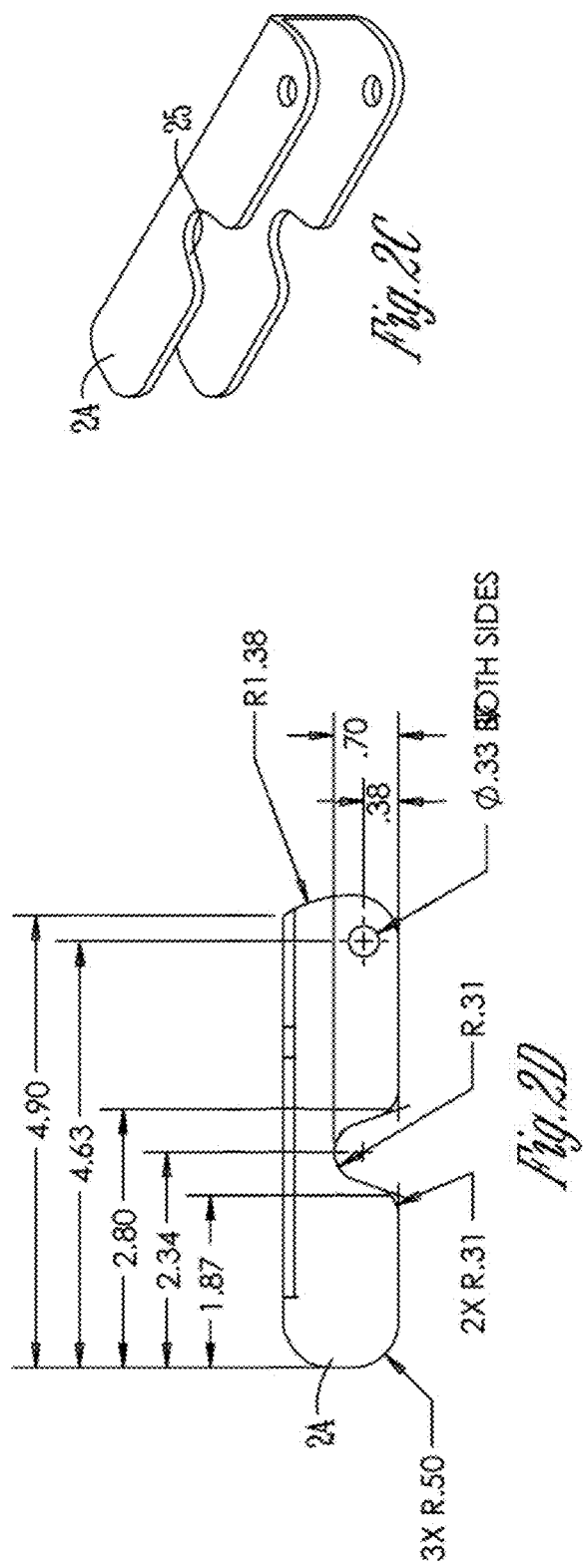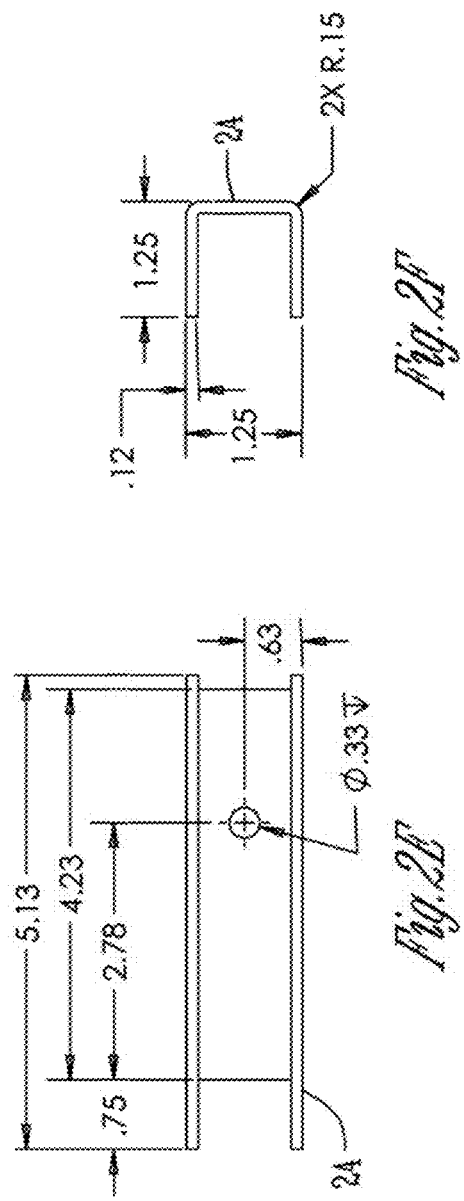

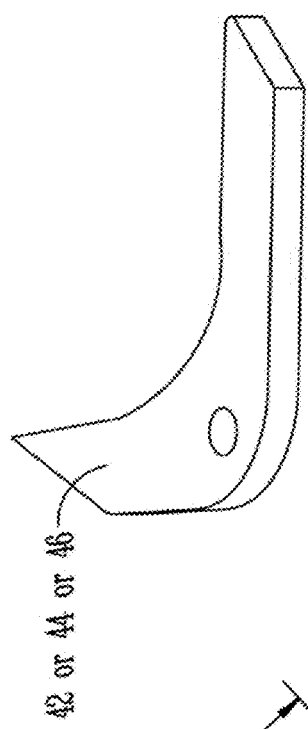
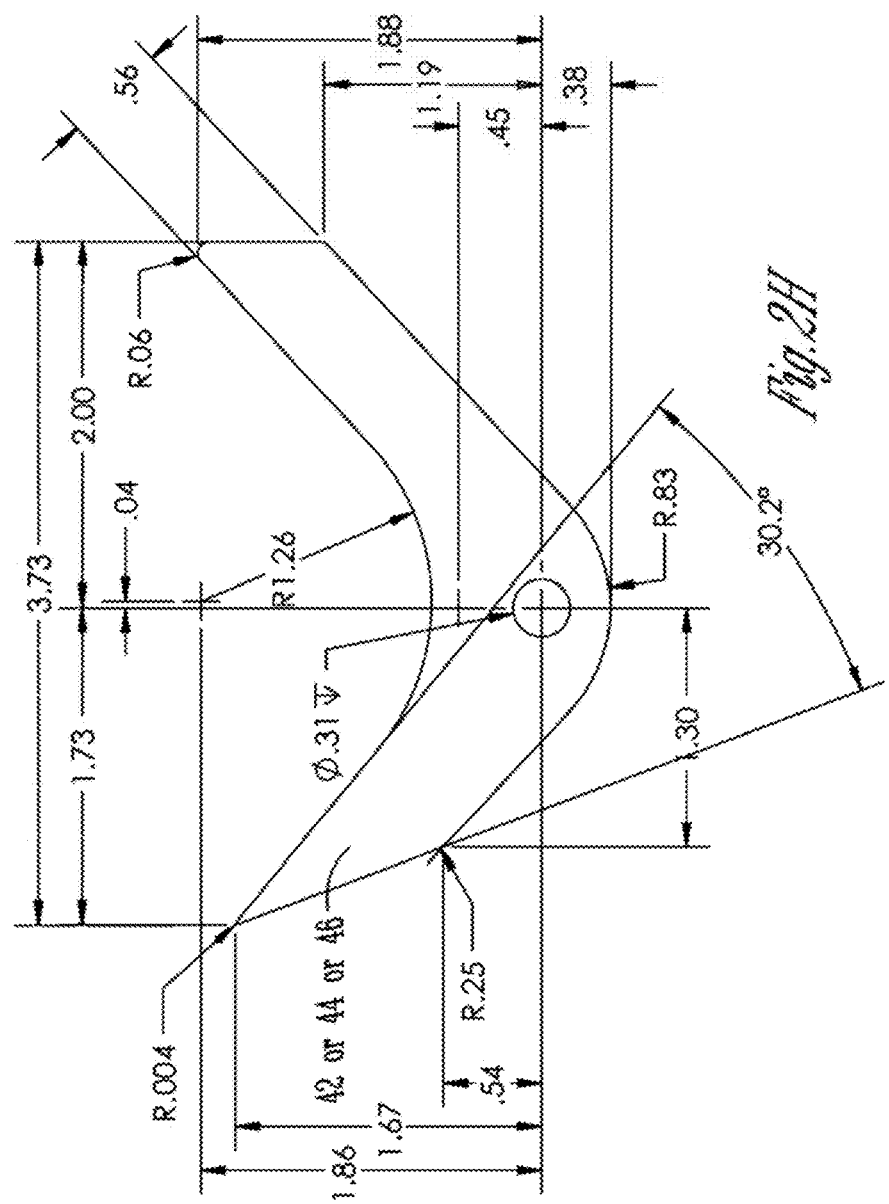

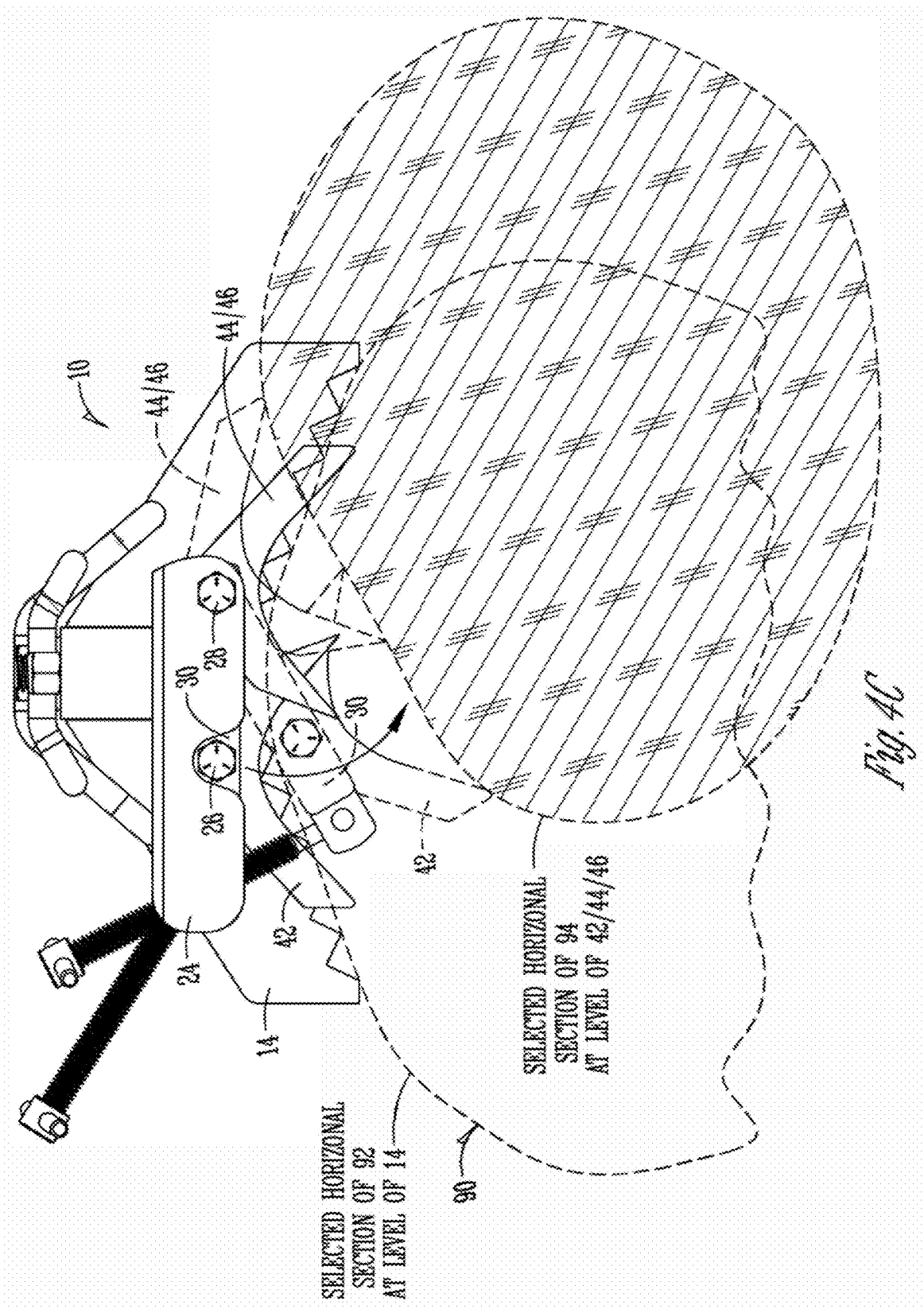

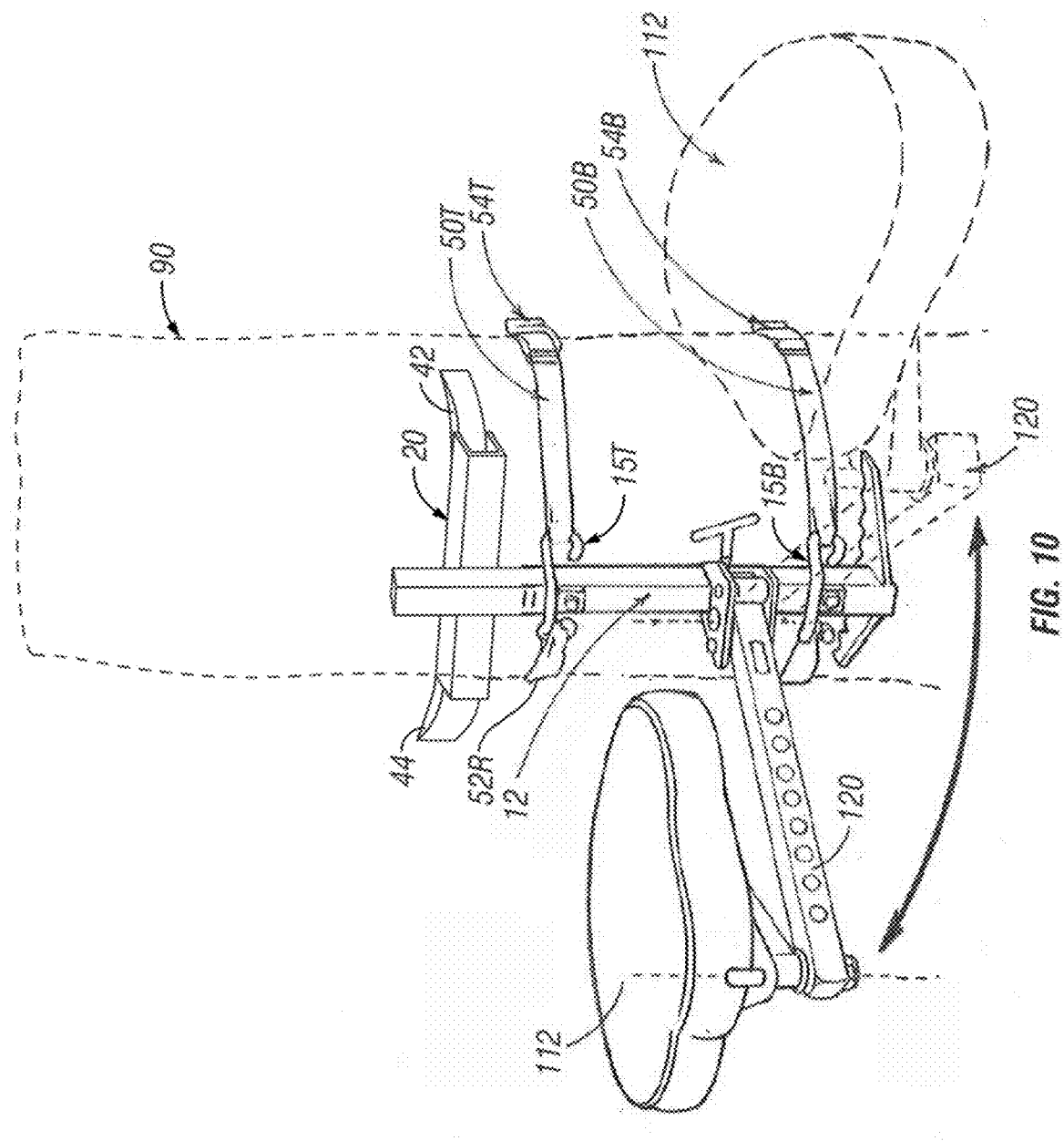

(TOP VIEW)

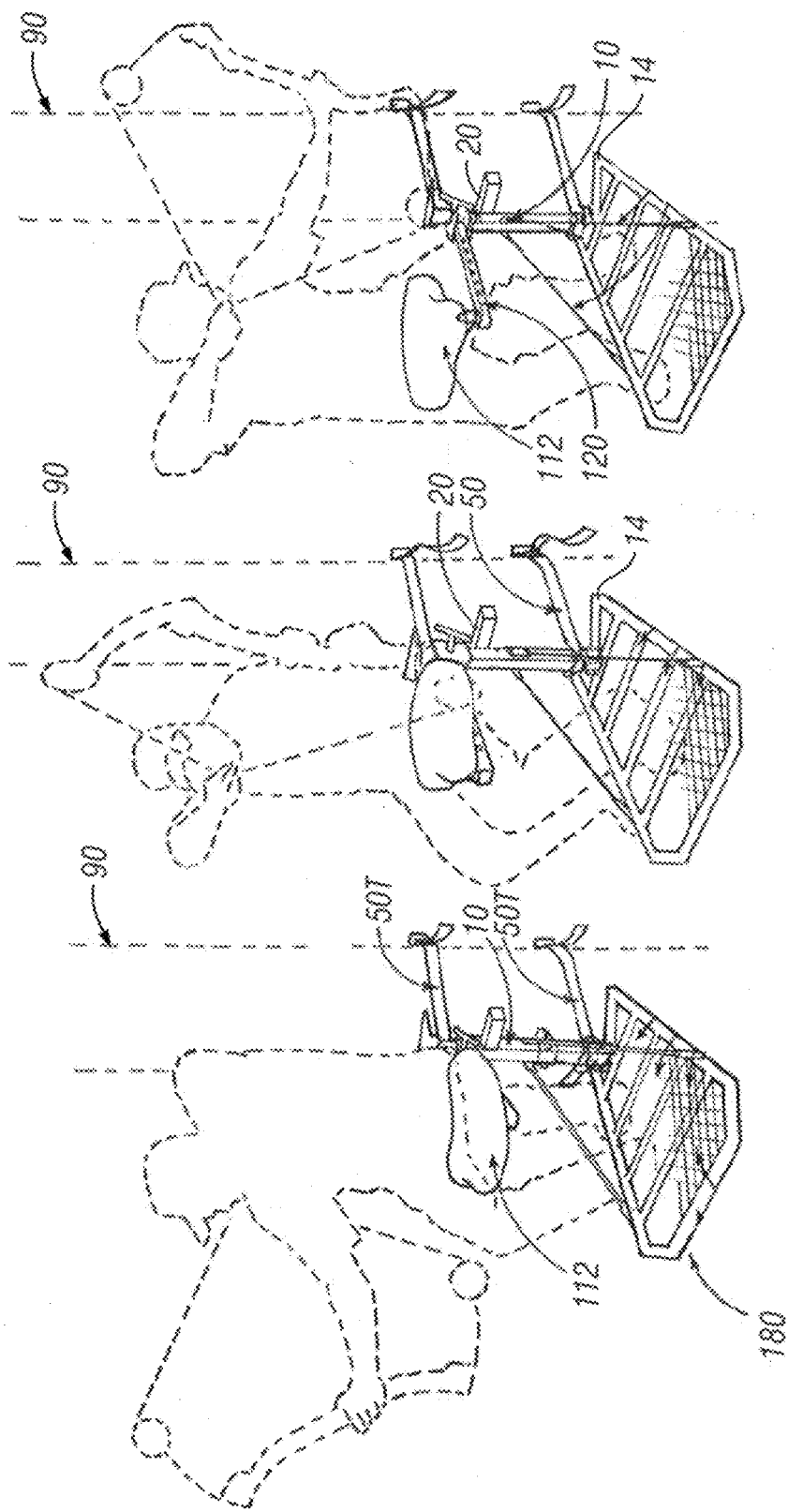

ADJUSTABLE BRACKET FOR SECURING TREE STANDS TO TREE TRUNKS

CROSS-REFERENCE TO RELATED APPLICATIONS

This application claims the benefit of provisional application Ser. No. 62/623,778 filed Jan. 30, 2018, which is incorporated by reference herein in its entirety.

BACKGROUND OF THE INVENTION

A. Field of the Invention

The present invention relates to securing, including but not limited to, along a vertical tree trunk such things as tree stands and/or seats for hunting or other uses, and in particular, to an adjustable bracket particularly adaptable to a variety of environments, one example being beneficial for mounting along crooked tree trunks.

B. Problems in the Art

There is a demand for securing stands or seats along tree trunks. Examples are hunters and photographers. The art is mature regarding the wide variety of different designs for tree stands and methods for securing them to tree trunks.

One example was commonly owned by the inventor of the present application. See U.S. application Ser. No. 14/020,055, now U.S. Pat. No. 9,743,774 issued Aug. 29, 2017, to Aaron Hauser and incorporated by reference herein in its entirety. Its general method for securement along a tree trunk is a vertical backbone. A clawed foot or cleat is at the bottom of the backbone to grip into the tree trunk. Near the top are a centering fixed bracket that can be generally V- or C-shaped with or without teeth. A web strap with shortening ratchet has hooks at opposite ends to connect to hooks or eyes on the backbone. The V-shapes at bottom cleat and top cleat try to automatically center the backbone. The strap, once tightened, pulls the backbone and cleats against the tree to secure it in place including when a tree stand (e.g. seat and/or foot platform are attached to the backbone).

As is well appreciated by those using tree stands, tree trunks vary not only in diameter, bark, height, and radiating branches, but also in straightness and symmetry, including variations along the vertical axis of the trunk. As is further appreciated by those skilled in the art, it can be highly beneficial if not almost essential that a mounted tree stand be level to horizontal and vertical. This is particularly true if the tree stand includes a swivel seat on pivot axis or arm. If not level in both directions, it makes it hard to operate. This can frustrate the user.

As will be appreciated by those skilled in this technical area, a tree stand must bear the weight of a human being. This means that over and above the weight of any seat and/or foot platform, from approximately 100 pounds to perhaps 300 pounds of the human must be supported by the mounting to the tree trunk. This presents substantial mass to support along the side of the generally vertical tree trunk. Thus, it is not trivial as to the materials, their interconnection, and their interoperation to support such masses.

Once mounted, the tree stand must be secure in substantially all ways. It cannot slide down the trunk or slide around the tree trunk. This is complicated by the wide variety of surfaces and shapes at the mounting location of tree trunks. Some barks are coarser and more textured, others smoother. Some trunks are relatively straight vertically; other can diverge left or right, or towards or away, or any of the foregoing at the mounting location. The diameter of the trunk varies as well as whether it is nearer or farther away from a circle-in-cross-section or not. It is therefore also not trivial as to how securement can be promoted in light of the different factors that can work against it.

It can therefore be appreciated that there are a number of considerations the designer of a mounting system for tree stands must take into account. Some are antagonistic with each other. For example, the materials and connections must be robust, which implies metal and strength, but the mounting system has to be lifted sometimes quite high off the ground which militates against large weight. Another example is adjustability. It can be advantageous to have manually adjustments to react to and compensate for various mounting issues and environments, but this adds complexity and cost. The inventor has therefore identified a need in the art for improvements in this technical area.

SUMMARY OF THE INVENTION

It is therefore a principle object, feature, aspect, or advantage of the invention to improve over or solve problems and deficiencies in the state-of-the-art.

Other objects, features, aspects, or advantages of the invention include an apparatus or method as indicated above which:
 (a) Presents an adjustable bracket at the backbone that, in combination with a cinching strap and relatively easy adjustment controls, accommodates better a wider variety of mounting environments, including a wider variety of tree trunks and tree trunk form factors.
 (b) Presents a system that, especially, can overcome or reduce issues with crooked tree trunks at the mounting location.
 (c) Can be used advantageously with a wide variety of different things to mount along a tree trunk. A few non-limiting examples are a seat for seated hunters or photographers, a foot stand for standing hunters or photographers, or both.
 (d) Can operate over a range of tree trunk diameters.
 (e) Has a plurality of features that can be used together or individually or in any combination.
 (f) Is relatively non-complex, automatically promotes grip of a tree trunk to resist both movement along the trunk or around the trunk but includes multiple hand-adjustable controls to promote easy and fast mounting and unmounting.

These and other objects, features, aspects, and advantages of the present invention will become more apparent with reference to the accompanying description, drawings, and claims.

In one optional aspect according to the invention, a tree stand backbone includes a crossmember or crossbeam that is rotatably adjustable in a plane through the longitudinal axis of the backbone (generally vertical plane when the apparatus is mounted to a tree trunk) at a connection point to the backbone. This feature alone allows a backbone with a fixed bottom cleat to be adjusted to a trunk that is crooked by angling either to the left or right at or near that vertical plane by rotating that crossbeam. The range of rotational adjustment can be 0 to 360 degrees in either direction, or some fraction of the same. A manually-adjustable control can release the crossmember for adjustment and lock it into a selected position. The adjustable crossbeam can include some type of cinch or cleat/claw to grip the tree trunk at a position above the fixed bottom cleat when the entire apparatus is cinched to the tree trunk. This feature allows better conformance of mounting of the overall apparatus when the tree trunk is crooked to the left or right above the fixed lower cleat.

Another optional aspect according to the invention includes a crossmember or cross beam mounted at the backbone and, in addition, a secondary crossmember or crossbeam assembly pivotably mounted at or near one end of the crossmember, with the opposite free end of the secondary crossmember assembly adjustably moveable away from the first crossmember. The range of angular adjustment can be at any acute angle relative to a plane generally through the backbone and the crossbeam. This range would typically be least than 90 degrees, and more on the order of no more than 45 degrees and likely no more than around 30 degrees or some fraction of the same. A manually-adjustable control can adjust the angle in that range according to user preference. At least one cleat or V- or C-shaped member, or some other similar gripping member, can be mounted in the secondary crossbeam. This allows that cleat or other gripping member to be moved from alignment with the first crossbeam and pivoted outward to a setting in an arc within the range of pivoting by the appropriate control of the manual adjustment member. This feature alone would allow for better conformance to tree trunks that are crooked, including at least those that angle or tilt away from a vertical plane at the mounting location of the lower fixed cleat. This secondary crossmember can be used with a fixed first crossbeam (e.g. non-rotatable or otherwise not adjustable) on the backbone or the rotatable one described above. When used with the rotatable crossbeam aspect, there are two-degrees-freedom-of-movement manual adjustment of the mounting for a variety of tree trunk form factors. The secondary cross beam assembly can be a unitary piece, or it can made up of a plurality of pieces.

Another aspect according to the invention includes a cleat with a V- or C-shape generally and is pivotably mounted in the crossbeam, if only one crossbeam is used, or in the secondary crossbeam if it is used. The V- or C-shape has a somewhat of a boom-a-rang shape. A somewhat concave inner edge terminates at opposite ends at relatively sharp points. If the tree trunk at the plane of contact with this cleat is wider than the distance between opposite sharp points, those sharp points will normally dig into the trunk and deter slippage either along the trunk or around the trunk. If the tree trunk is narrower, it will fit within the opposite sharp points but the concave edge will normally dig into the trunk or at least deter slippage along the trunk. A second, spaced apart cleat (e.g. below this cleat) can include features (e.g. serrations) and have a radius of curvature shallower than most tree trunk widths to deter slippage along or around the tree trunk. In one embodiment this cleat in the crossbeam can be fixed relative to the crossbeam. If the crossbeam is rotatable, as with the optional aspect previously discussed, a fixed cleat will conform better to a crooked tree trunk if rotation is matched or moved towards the direction of crookedness. If the cross beam has the secondary crossbeam assembly, a fixed cleat will also conform better to a crooked tree trunk if the secondary crossbeam can be angularly adjusted at least somewhat in the direction of the crookedness. If this cleat is used with both a rotatable crossbeam and an angularly-adjustable secondary crossbeam, more options for conformance to a crooked tree trunk are available.

Another optional aspect according to the invention is a cleat as discussed above, but that it is pivotably mounted in either the crossbeam or the secondary crossbeam. The pivot axis could be generally perpendicular to the longitudinal axis of the crossbeam or secondary cross beam to which it is pivotally mounted. The pivot axis is at least towards the middle of the cleat. This allows the cleat to self-center relative the tree trunk or at least automatically move to promote either both opposite sharp points to abut and dig in the trunk for certain diameter trunks or good contact of at least part of the inner concave edge of the cleat with trunks of smaller diameter.

Another optional aspect according to the invention includes both a cleat as described above plus one or more secondary cleats or V- or C-shaped members, or similar gripping members, pivotally mounted towards one end of the first crossbeam or, if used therewith, the secondary crossbeam. In one example, if a single secondary cleat, it can be smaller than but nested above or below a first larger cleat so as to allow independent pivoting relative the first larger cleat. Because the secondary cleat pivot axis is spaced from the attachment point of the first cleat, this allows one end of the second cleat to pivot over an adjacent end of the first cleat. This relationship can promote better conformance of the two cleats to a tree trunk, including basically automatic positioning of the second cleat for best gripping of the tree trunk. It can provide four sharp cleat ends for gripping for certain larger diameter trunks. It can provide self-centering and better contact of concave edges of both cleats for some smaller trunks. This independently pivoting relative the larger cleat allows further options regarding securement to a variety of tree trunk form factors.

In a still further optional aspect of the invention, both the larger and the smaller cleats can pivot on spaced apart but generally parallel pivot axes. This imparts the self-centering and automaticity/enhanced of gripping by both cleats.

In a still further optional aspect of the invention, the second cleat can be on at least the same order of size as the first cleat. The ability of at least one cleat to pivot relative the other promotes the self-centering and automatic/enhanced gripping over a variety of trunk diameters. Both cleats could pivot on spaced-apart axes as discussed above.

Another optional aspect of the invention is a pair of second cleats, each at least generally the same size and form factor and each pivotable on the same that pivot axis. In one embodiment each secondary cleat is spaced apart from one another along their shared pivot axis at least a distance slightly greater than the thickness of the first clear. By appropriate mounting of the pair of secondary cleats and the first cleat on the crossbeam or secondary crossbeam, a sharp end of the first cleat can pass between adjacent sharp ends of the pair of secondary cleats so there is overlapping but freedom of movement relative to one another. This pair of secondary cleats can further present another set of sharp ends or another inside edge for gripping, while maintaining the ability of automatic adjustment to different tree trunks, self-centering, and enhanced support both along and round the trunk.

In another aspect of the invention, any combination of the foregoing aspects or features can be utilized in an apparatus, method, or system.

In another aspect of the invention, any of the aspects discussed above can be combined in an apparatus or method which includes a technique to cinch the backbone, lower cleat, crossbeam or beams, and upper cleat or cleats to a tree trunk. In one embodiment this can be one or more straps each with a manual-length adjustment mechanism. In one example, this is a strap with a follow-long or ratcheting mechanism that can shorten or lengthen the overall length of a strap between opposite ends. In one example, the strap and follow-along or ratchet mechanism are looped around the tree trunk. Hooks or other connectors at opposite ends of the strap section are connected to the backbone. The mechanism is then manually operated to shorten the strap until tightly cinched to the trunk, where the lower cleat comes into abutment with the trunk, and the upper cleat or cleats then do.

In another aspect of the invention, any of the aspects discussed above can be combined with a tree stand mounted to the backbone. In one example the tree stand can be a seat. In one example, the seat comprises a single cantilever arm extending from the backbone and pivotable in a plane generally orthogonal to the longitudinal axis of the backbone, and the seat is eccentrically mounted to the single cantilever arm. IN another example, the tree stand is a foot rest or platform extending form the backbone. In another example, the tree stand is a combination of a seat and a foot rest or platform. Other accessories can be mounted to either the backbone or the tree stand.

BRIEF DESCRIPTION OF THE DRAWINGS

FIG. 2C is a still further enlarged and isolated perspective view of main crossbeam or adjuster frame 24 from subassembly 20 of FIGS. 2A and B. FIGS. 2D-F are isometric views of frame 24 of FIG. 2C, including exemplary dimensional annotations for one example.

FIG. 2G is a still further enlarged and isolated perspective view of claw or adjuster grip 42, 44, or 46 of FIGS. 2A and B. FIG. 2H is a top plan view of FIG. 2G, including exemplary dimensional annotations.

FIG. 10 is similar to FIG. 1 of U.S. Pat. No. 9,743,774 but shows the apparatus of FIGS. 1A and B installed on a tree trunk in combination with a hunter's seat installed on the outward side.

FIGS. 13A-C are perspective views of the apparatus of FIGS. 1A and B installed on a tree trunk in combination with the seat and foot rest of FIG. 12 but showing how the combination allows a hunter to be securely supported on the tree trunk while changing positions on the seat and foot rest.

DETAILED DESCRIPTION OF EXEMPLARY EMBODIMENTS

A. Overview

For a better understanding of the invention, several specific examples will now be illustrated and described with reference to the accompanying drawings and appendices. It is to be understood that variations are, of course, possible depending on designer need or desire.

It is furthermore to be understood that the exemplary embodiments disclose a combination of features. The invention can be implemented using just one of them or any combination thereof.

The embodiments will be described in the context of a backbone such as that of incorporated by reference U.S. Pat. No. 9,743,774, having a use for providing a secure mounting for such things as hunter's tree stands or seats along a tree trunk. It is to be appreciated that the invention could be applied for mounting to other vertical structures in analogous fashions.

B. Apparatus

Figure 1A:
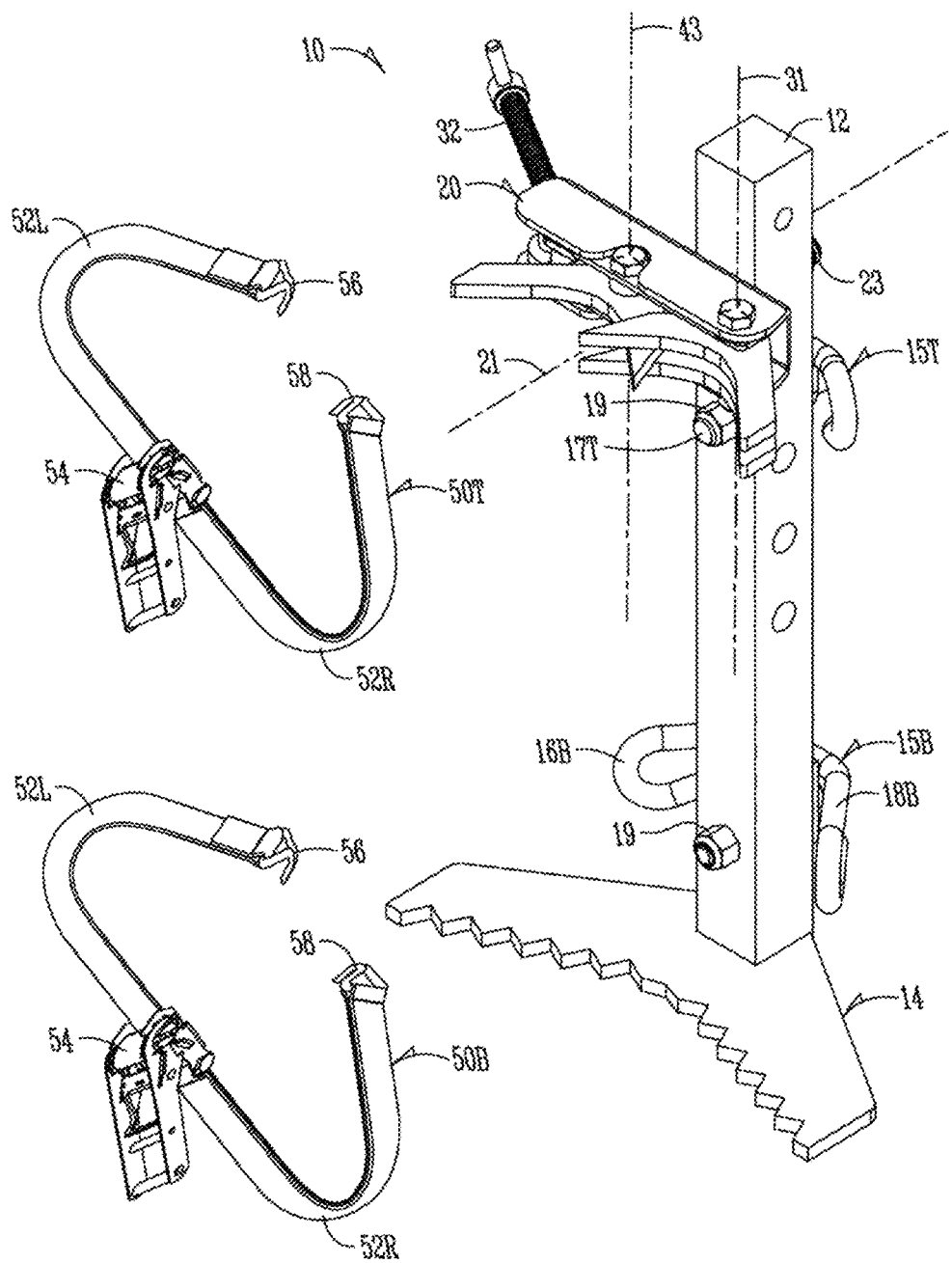
FIG. 1A is an assembled perspective view of one exemplary embodiment 10 according to the invention shown with an example of a tree trunk mounting strap assembly 50 detached.

With specific reference to FIGS. 1A and B, an apparatus 10 according to the invention includes a backbone or vertical brace tubular member 12 having a bottom cleat or large teeth plate 14 and some type of loops or ears 16 and 18 for attachment of opposite ends of a cinching strap assembly 50. These features are as in U.S. Pat. No. 9,743,774.

For purposes of reference, U.S. Pat. No. 9,743,774 has a similar lower large teeth bottom cleat that is fixed to backbone a backbone but also has a fixed upper cleat towards the top of the backbone (see U.S. Pat. No. 9,743,774 FIG. 1). Both bottom and top cleats can be generally V- or C-shaped to try to help automatically center themselves relative a tree trunk if it is at least relatively vertically straight.

In contrast, as shown in the figures, apparatus 10 according to aspects of the present invention differs by having the following adjustability features related to that upper tree-abutting cleat.

1. First Main or Adjuster Frame Crossbeam 20

A C-shaped-in-cross-section channel piece forms a main crossbeam or frame 24 for the top cleat adjuster subassembly 20 and is pivotally attached at pivot pin 22 (e.g. ½-13 hex head cap screw) to the tree side of backbone or vertical brace 12. Frame 24 has opposite ends transverse of the longitudinal axis of backbone 12. Its attachment at pin 22 allows it to rotate around rotation axis 21. Therefore, it is not permanently fixed relative the backbone axis 12. This can allow for compensation for tree trunks, at the point of abutment, that diverge left or right from horizontal.

As can be appreciated, however, by appropriate hardware (e.g. ½-13 locknut 23), pin 22 can be tightened or untightened against backbone 12 such as by a ratchet wrench to secure it in pivoted position at the desire of the user. Alternatively, it may be the designer's wish to simply have the whole crossbeam assembly 20 freely pivotable on axis 21.

Figure 2A:
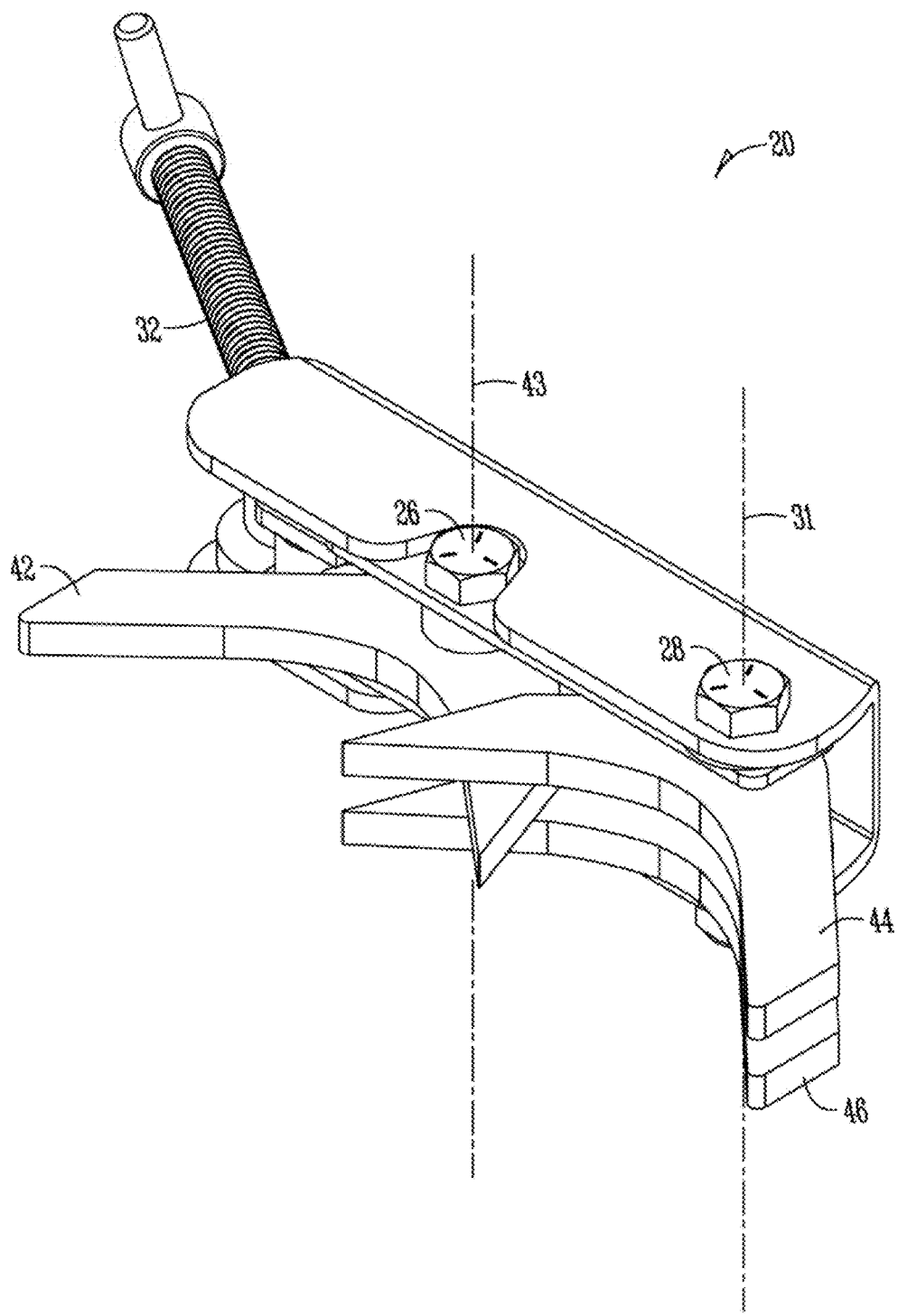
FIG. 2A is an enlarged assembled view of adjuster subassembly 20 of FIG. 1.
Figure 2B:
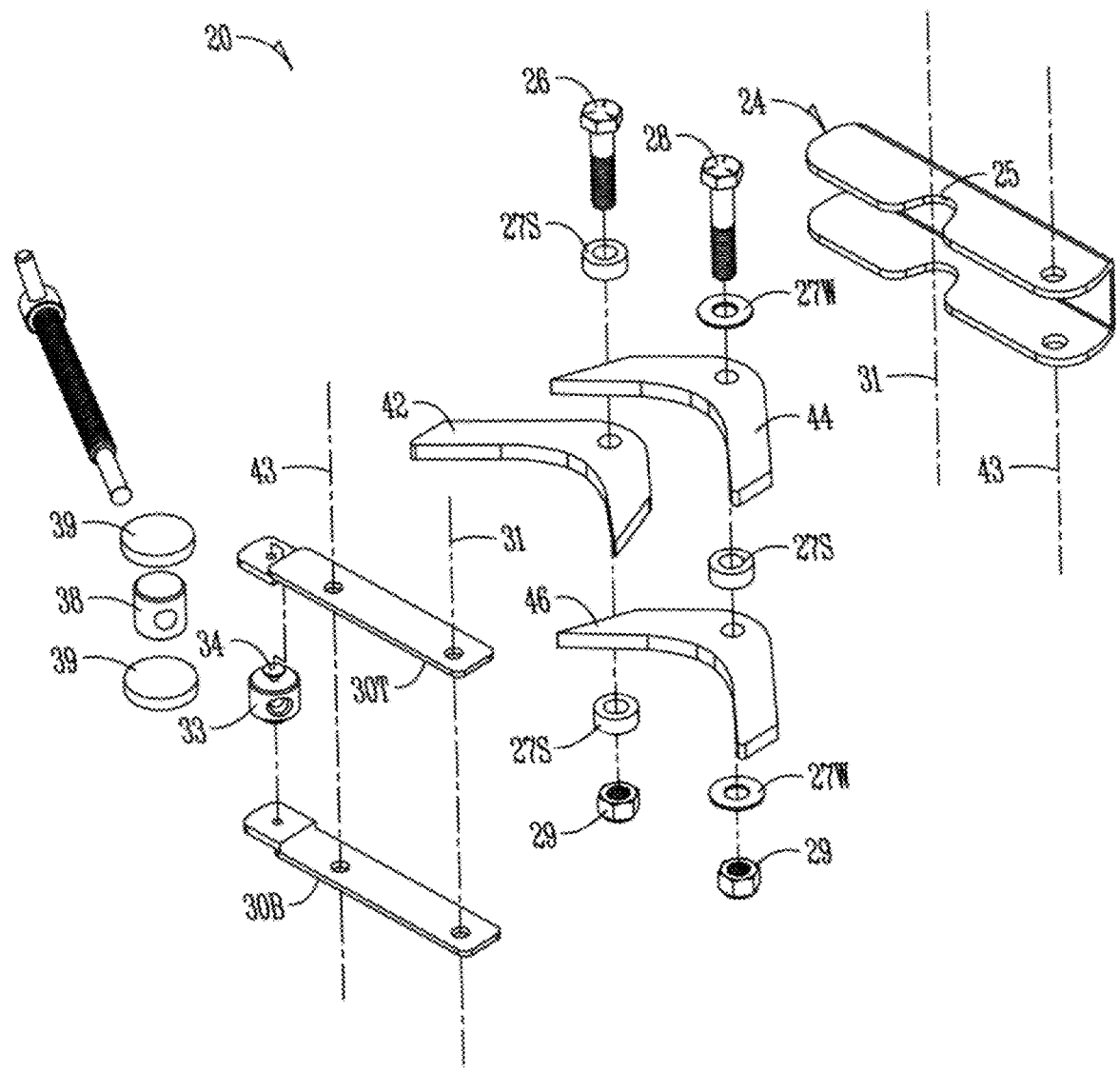
FIG. 2B is an exploded view of sub-assembly 20 of FIG. 2A.
Figure 3A:
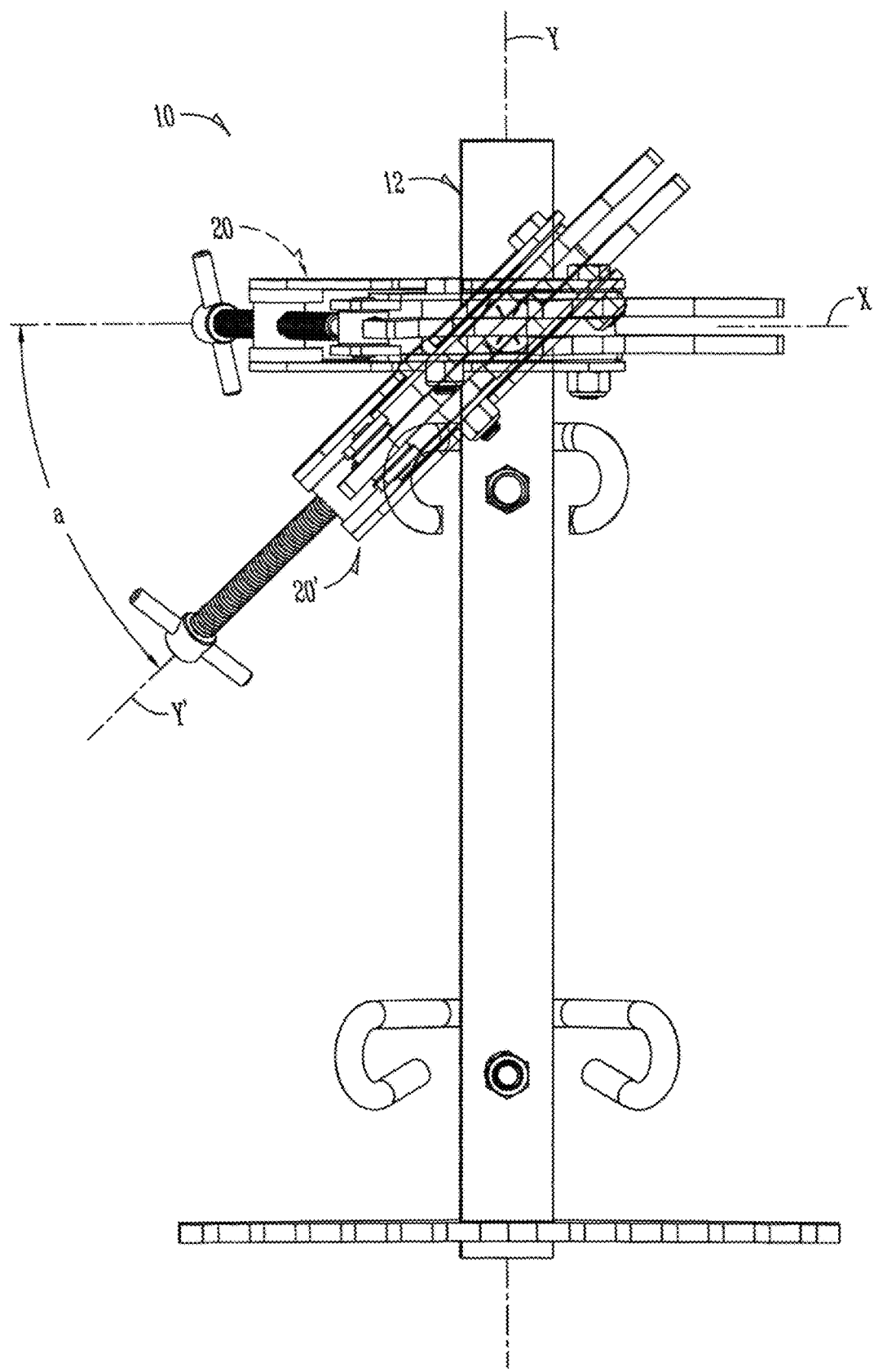
FIGS. 3A and B are front elevation and front perspective views, respectfully, of the embodiment of FIGS. 1A and B illustrating sub-assembly 20 in a first position (dashed lines) and a rotated position around a horizontal axis (solid lines) to allow a range of vertical adjustments of adjuster grip claws 42/44/46.
Figure 3B:
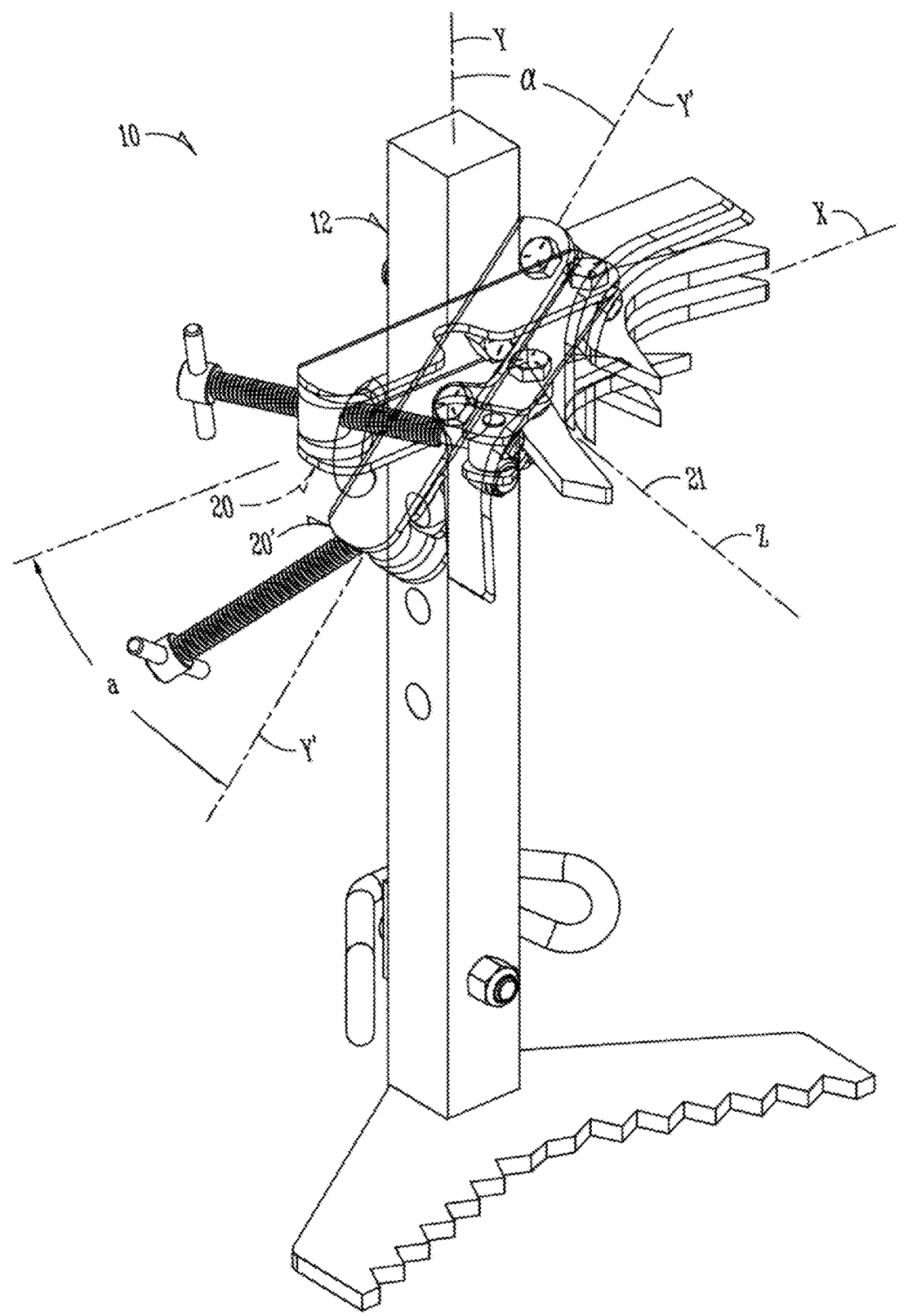
FIGS. 3C and D are identical to FIGS. 3A and B but also include a crooked tree trunk is shown diagrammatically which has a relatively vertically straight lower section 92 but a section 94 above that that diverges leftward relative backbone 12 of apparatus 10.
Figure 3C:
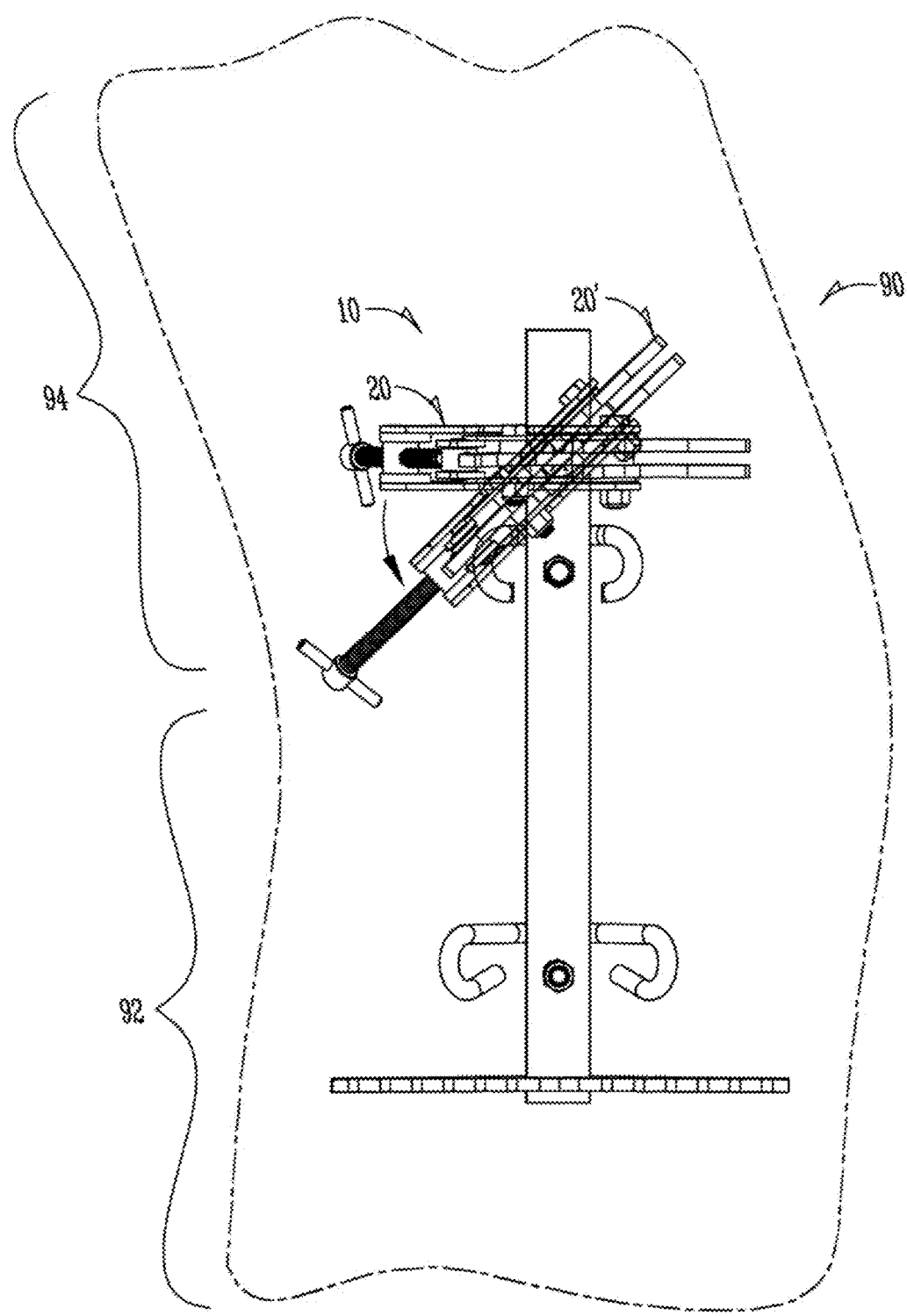
Figure 3D:
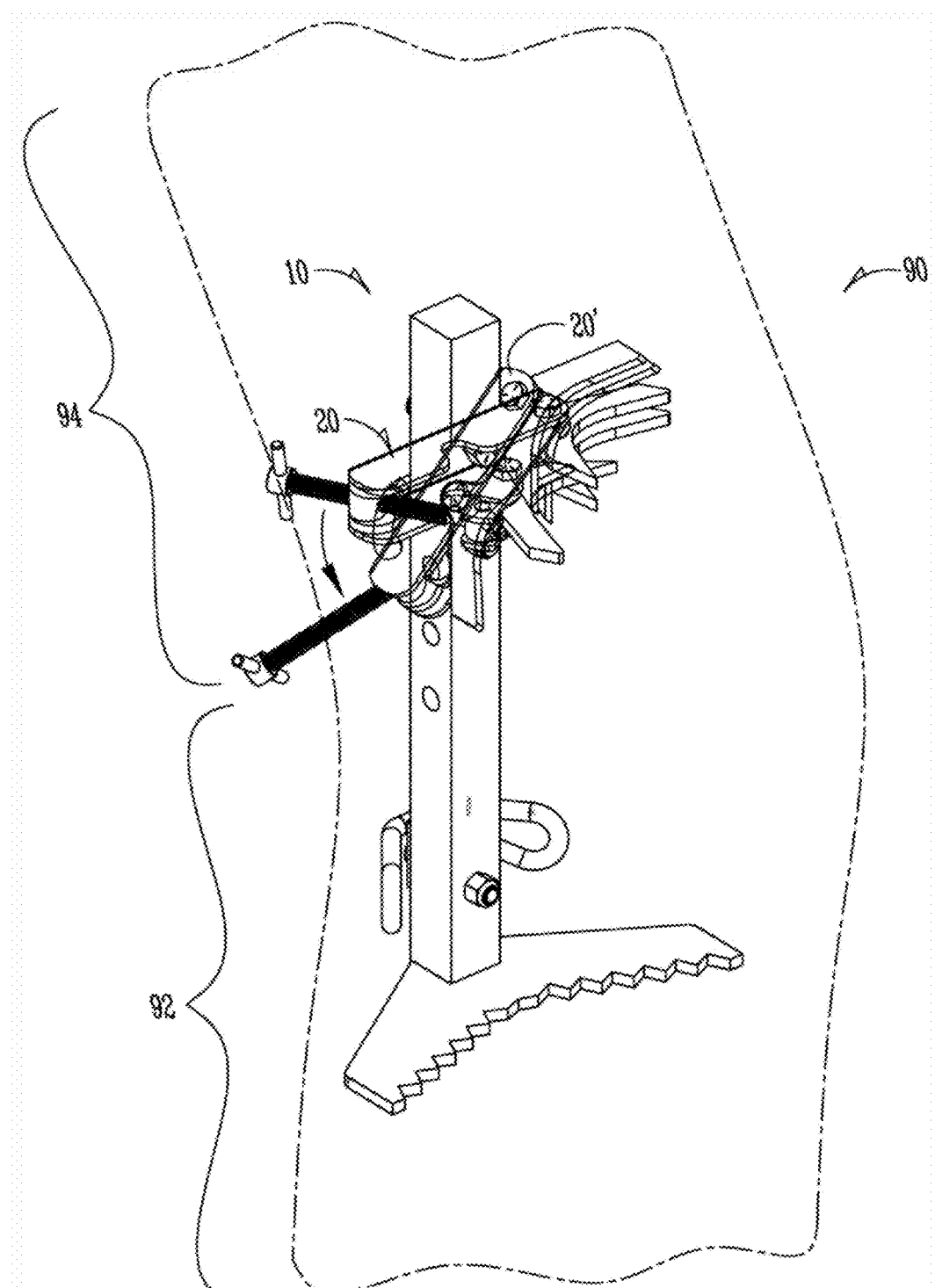
Figure 7:
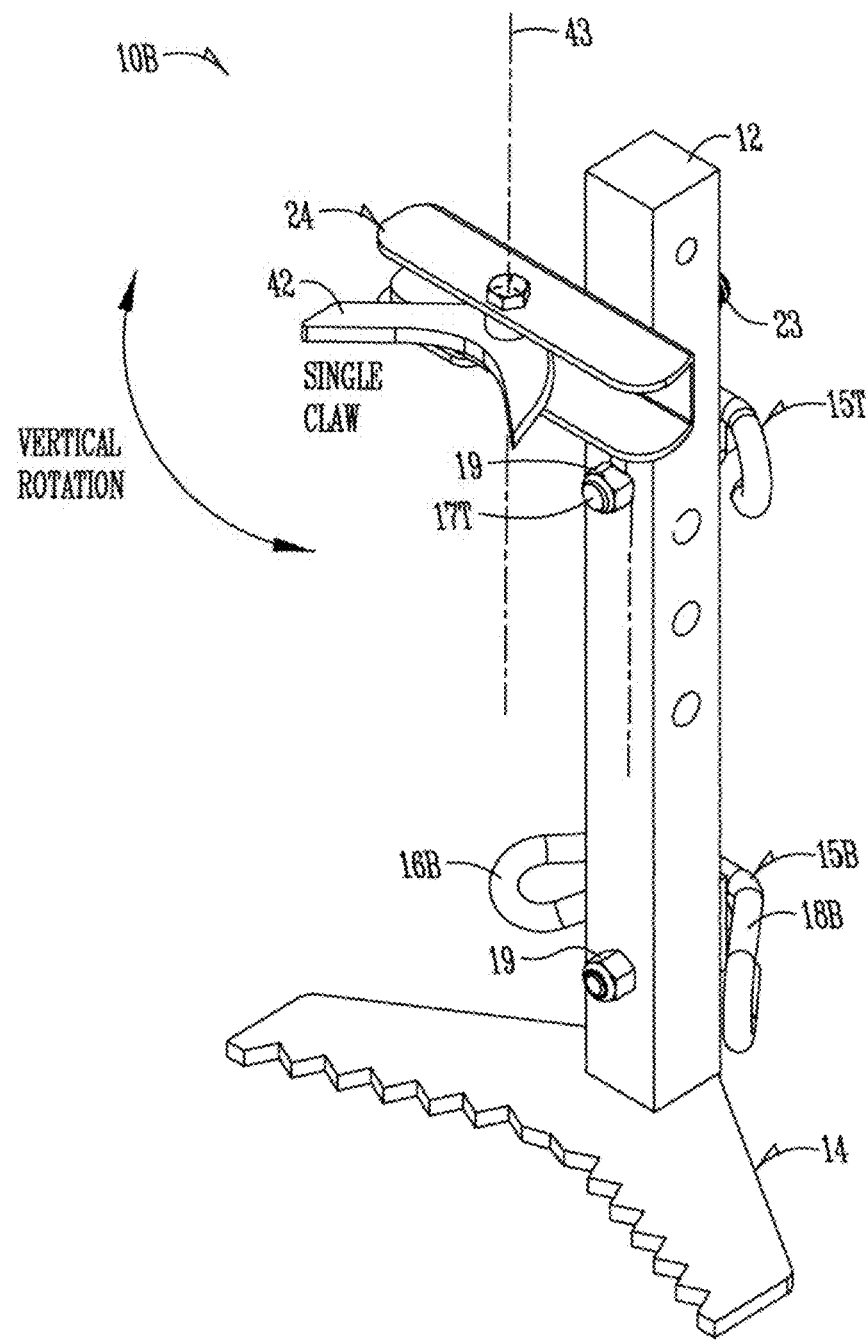
FIG. 7 is similar to FIGS. 3A and B but show an alternative embodiment according to the invention where just the vertical rotational adjustment feature of sub-assembly 20 is utilized by the apparatus with less than 3 claws.

Thus, if a top cleat (C-shaped or V-shaped) like at ref no. 52 of FIG. 2 of U.S. Pat. No. 9,743,774 were fixed in crossbeam assembly 20, this rotation feature alone would allow adjustability relative to a variety of tree trunk form factors. See, e.g., FIG. 7.

It is to be understood that crossbeam assembly 20 can be configured to rotate at least almost completely around its rotation axis 21 on backbone 12. This allows the subtle benefit of compensating for a wide variety of crooked tree trunks. But, as further described below, if a secondary cross beam 30 is used, it allows adjustability of that secondary cross beam 30 at least angularly outward from an end of primary crossbeam 24 for another degree of adjustability of cross beam assembly relative to a tree trunk, as will be described further below.

2. Secondary Crossbeam 30

Whether first crossbeam 24 is fixed relative backbone 12 or pivotable as described above, another possible feature is secondary crossbeam 30. In this example, secondary crossbeam 30 is pivotable at one end of first crossbeam 24 at axis 31 and adjustable from a nested position inside first beam 24 to away from beam 24 at the other end by some type of manual adjustment (e.g. in FIG. 1A a threaded rod 32 through a threaded block 38 fixed in beam 24 (e.g. welded to spacers 39 which are in turn welded to opposite interior top and bottom surfaces of channel member first crossbeam 24 to a threaded block 33 rotationally mounted by pin 34 in the free end of second beam 30. Rotation of a T-handle adjusts the position of the threaded rod of manual adjustment 32 in block 38 in beam 24, which in turn moves the free end of second beam 30 towards or away from beam 24. It thus can be nested basically parallel inside the interior of first crossbeam 24. By manually adjustable handled screw 32, secondary beam 30 can be pivoted around axis 31 so that its distal end from axis 31 can be moved away from crossbeam 24 over a range controlled by the length of screw 32.

In this embodiment, secondary beam 30 consists of the combination of top and bottom plates 30T and B that retain both adjustment screw retaining block 33 but also at least one claw or cleat. Thus, rotation of main beam 24 on backbone 12 allows essentially vertical adjustment of the one or more claws or cleats in second beam 30, but operation of adjustment screw 32 allows outward essentially horizontal adjustment of the one or more claws or cleats.

As can be appreciated, this allows compensation for a tree trunk that leans away and/or tilts one way or the other regarding backbone 12 and vertical.

In this embodiment, a first claw or cleat 42 can be rotatable mounted between top and bottom plates 30T and B of secondary crossbeam 30 with a pin (here a ⁵⁄₁₆×1⅜ hex head screw, two bushings 27B and a ⁵⁄₁₆ steel locknut 27N). See FIGS. 2A and B. If cleat 42 where used alone, it would basically self-center when moved into abutment with a tree trunk to help grip and/or center on the tree trunk.

As mentioned above, if beam 24 is rotatable on backbone 12, it can be rotated to the best orientation the user decides relative the axis and perimeter of the tree trunk. The beam 24 can be rotated over a range that might even include 360 degrees. But typically tree trunk crookedness would by only a fraction of even 90 degrees either clockwise or counter-clockwise from the viewing direction in FIG. 1A, and more typically less than 45 degrees.

In some cases, rotation might be restricted by the T-handle of rod 32. It can act as a mechanical stop to rotation around axis 21 if it hits the bottom of backbone 12 (e.g. if assembly 20 is rotated approximately 70 to 80 degrees counter-clockwise in FIG. 1A. But if the top of backbone 12 is short enough, rod and handle 32 would clear the top of backbone when assembly 20 is rotated around rotation axis 21 in a clockwise direction from its position in FIG. 1A. Threaded rod and handle 32 would move over and then to the opposite side of backbone 12. It would rotate around axis 21 at least on the order of 300 degrees. This allows a subtle but important further flexibility of adjustability relative to different tree trunks. The extension of the free end of secondary beam 30 with threaded rod/handle 32 can therefore be on either side of backbone 12. Threaded rod 32 is on the side of backbone in FIG. 1A, secondary beam 30 can be angularly adjusted outward around pivot axis 31 on the opposite side of backbone 12. But if the whole assembly 20 is rotated clockwise greater than 90 degrees from the position shown in FIG. 1A, threaded rod/handle 32 will now be on the opposite side of backbone 12. Angular adjustment of secondary beam 30 would then extend the end of secondary beam 30 from the other side of backbone 12 from that shown in FIG. 1A. This provides for an additional degree of adjustability for different tree trunks.

As can be seen in exemplary embodiment in the Figures, secondary cross beam 30 is made up of upper and lower rectangular plates 30A and 30B. Washers and bolts, which become spacers and pivot axes, hold plates 30A and B apart when assembled. Thus, plates 30A and B, when assembled, pivot together around pivot axis 31 as a unit, along with the cleats mounted thereto. Secondary beam and its pivoting are not limited to that arrangement.

Figure 8:
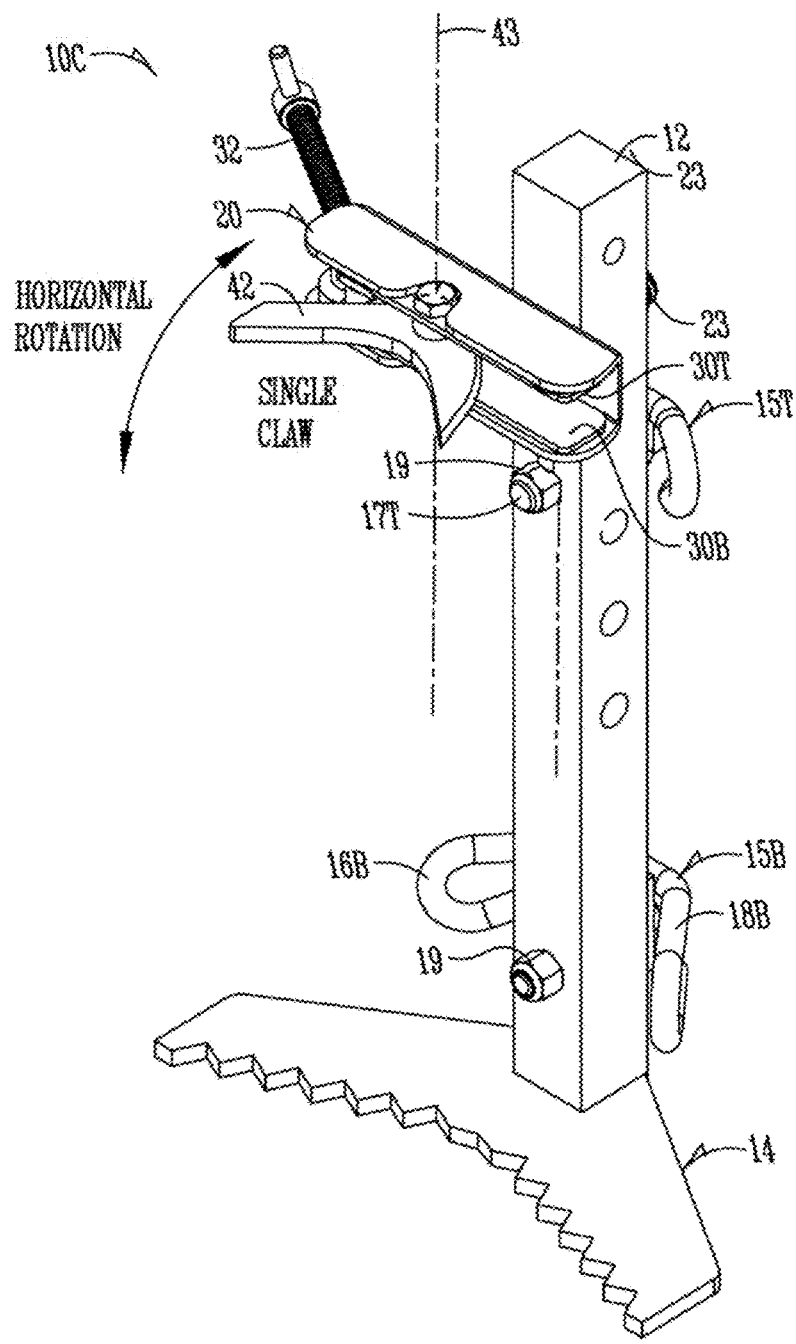
FIG. 8 is similar to FIGS. 4A and B but show an alternative embodiment according to the invention where just the horizontal adjustment feature of sub-assembly 20 is utilized by the apparatus with less than 3 claws.

As will be appreciated by those skilled in this technical area, if a single cleat 42 is used in secondary beam 30 (FIG. 8), it does not necessarily have to be pivotable relative to secondary beam 30. It could be fixed in place. The vertical adjustability of the whole beam assembly 20 alone would provide advantageous adjustability once the fixed cleat 14 at the bottom of backbone 12 is brought against the tree trunk. Or the outward angular horizontal adjustability of secondary beam 30 along would provide advantageous adjustability once the fixed cleat 14 is brought against the tree trunk.

FIGS. 3A-D illustrate the vertical adjustability of the main beam 24 around axis 21 relative to backbone 12 for a first angle of approximately 30 degrees counterclockwise (solid lines) from a horizontal position (dashed lines) of assembly 20. If a tree trunk 90 has a relatively vertical section 92 where bottom cleat 14 can dig in, an upper trunk section 94 that diverges at or near 30 degrees to the left from vertical at the plane of a cleat in assembly 20 in FIG. 3C, counterclockwise rotation of assembly 20 to match that trunk angle (or at least somewhat near it), will promote good gripping of a cleat in assembly 20 even though the trunk is crooked in that direction. Of course, other trunk angles can be compensated for by appropriate assembly 20 rotation around axis 21.

Figure 4A:
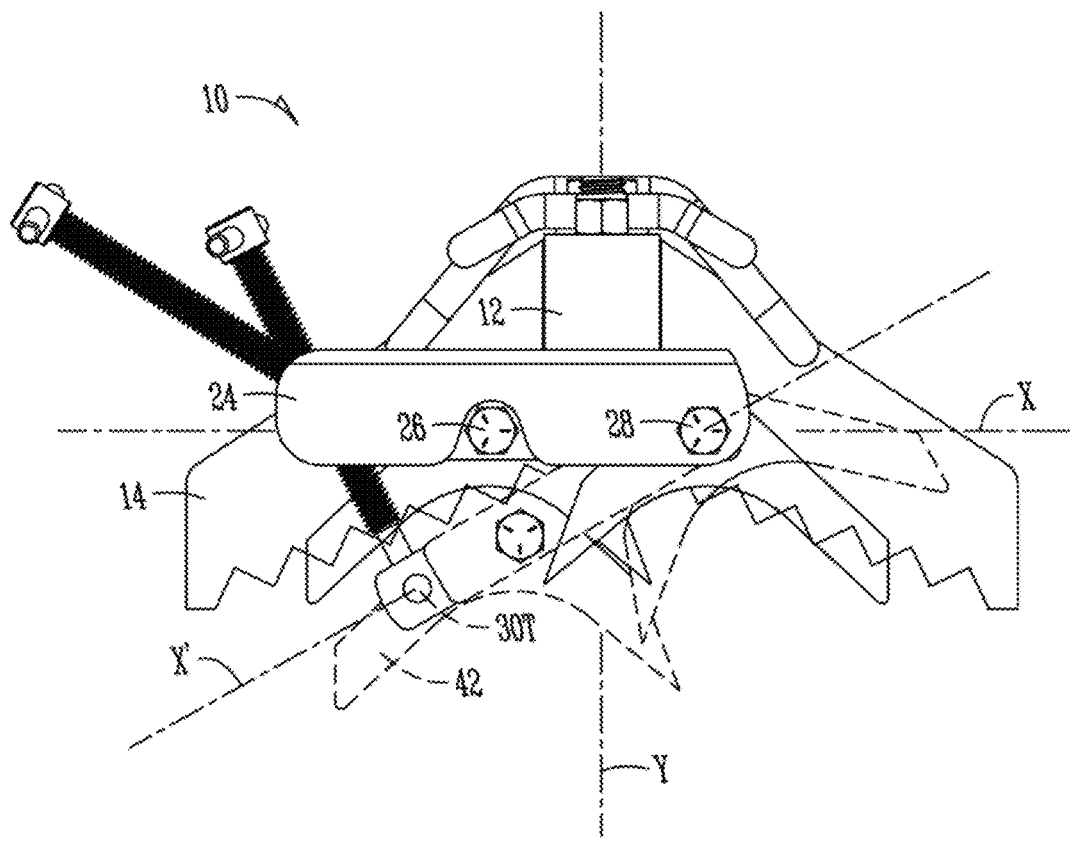
FIGS. 4A and B are top plan and front perspective views, respectfully, of the embodiment of FIGS. 1A and B illustrating sub-assembly 20 in the first position of FIGS. 3A and B but a secondary crossbeam or retaining plate combination 30T/B and claws 42/44/46 is a nested first position within adjuster frame main crossbeam 24 (solid lines) and an angularly outward position (dashed lines) to allow a range of more horizontal adjustments for claws 42/44/46.
Figure 4B:
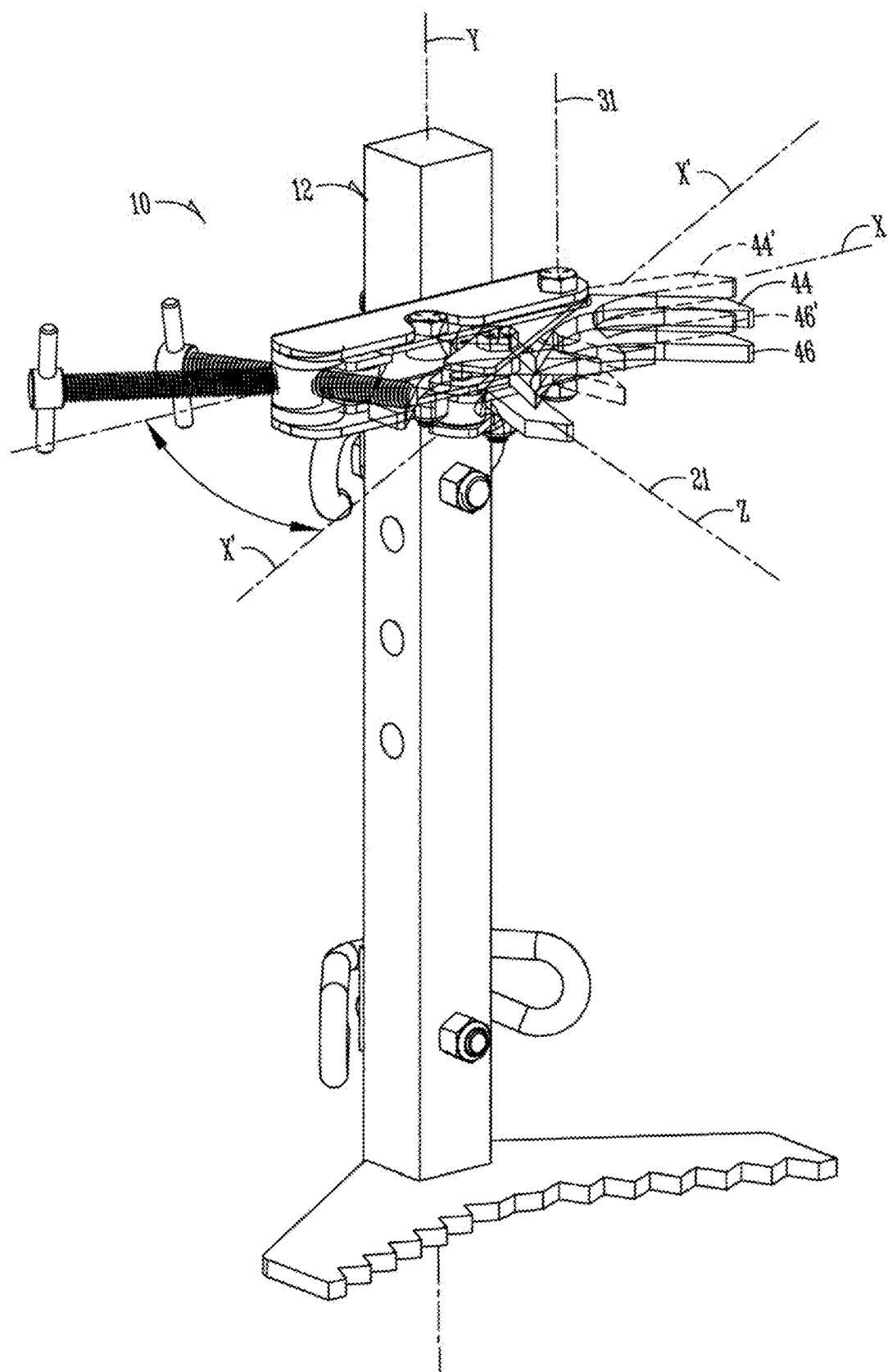
FIGS. 4C and 4D are identical to FIGS. 4A and B but also include a crooked tree trunk is shown diagrammatically which has a relatively vertically straight lower section 92 but a section 94 above that that diverges outwardly and away from backbone 12 of apparatus 10.

FIGS. 4A-D illustrate horizontal adjustability if secondary beam assembly 30 is used. In FIGS. 4C and D a tree trunk 90 is diagrammatically illustrated having a lower portion 92 that is generally vertical, but an upper portion 94 that diverges outward and away from the general vertical axis of lower portion 92. If lower cleat 14 is dug into lower portion 92 as shown, the upper cleat or cleats in crossbeam assembly 20 would not reach upper portion 94 or, to do so would tilt backbone 12 substantially from vertical to allow the upper cleat in assembly 20 to dig into the crooked trunk portion 94. As will be appreciated by those skilled in the art, if backbone 12 is not at least generally vertical, it can make it difficult to mount a seat, footrest, or other tree stand structure to the backbone in a level position. An at least generally level, and preferable most times a close to or at level position is beneficial both to good gripping and stable mounting to the tree but also user performance. A hunter or photographer can perform better at level. This can be particularly true if the seat used in the tree stand rotates or can be manipulated while the user is seated. An example is shown in FIGS. 10-13 and in U.S. Pat. No. 9,743,774.

Again, regarding horizontal adjustment, if the rotational adjustment of the whole assembly 20 around horizontal axis 21 allows on the order of at least 300 degrees rotation of the whole assembly 20 on axis 21, the horizontal adjustment of FIGS. 4A-D could be angularly outward as shown in FIGS. 4C and D (pivoting from the right side of secondary beam 30 in those Figs. But the whole assembly 20 could be rotated to move threaded screw/handle 32 to the left side of backbone 12 in the viewing direction of FIG. 4C to angular extend secondary beam 30 on the left side relative to backbone 12, instead of the right side as shown in FIG. 4C.

And, of course, the ability of both vertical adjustment over a range as shown in FIGS. 3A-D plus angular outward adjustment as shown in FIGS. 4A-D provide for a wide variety of adjustments for different trees.

3. Double Claws

As further shown in the figures, another possible feature is, instead of one fixed claw or cleat like in U.S. Pat. No. 9,743,774, a combination of claws or cleats can be used. As shown more particularly in FIGS. 2A-D, in this embodiment there are three claws 42, 44, and 46. Double claws 42/44/46 could be used alone in some type of crossbeam 24, either fixed to backbone 12 or rotatable like around axis 21.

Claw 42 is pivotally mounted at axis 43 at or near its center between and towards one side of second beam top and bottom plates 30T and B. It freely pivots around axis 43.

Claws 44 and 46 are basically stacked one above the other when assembled on the other side of plates 30T and B by pin 28 (e.g. 5/16-18×1/5/8 hex head screw and 5/16 steel locknut) through aligned apertures in top and bottom second beam plates 30T and B. Both claws 44 and 46 pivot freely around the same axis 31 (axis 31 here is the same that second beam 30 pivots on). Claws 44 and 46 are spaced and held apart by a bushing 27B so that the closest side of claw 42 can pivot freely between them. Thus, as shown in the drawings, there is slight overlap to adjacent ends of the claw 42 with claws 44/46 (see FIG. 4B) when they are rotated to each other. Note that washers 27W are thinner than bushings 27B so that single claw 42 is centered between claws 44 and 46 but that stacked claws 44 and 46 fit in the same distance between plates 30T and B as single claw 42 and its three bushings 27B.

Figure 5:
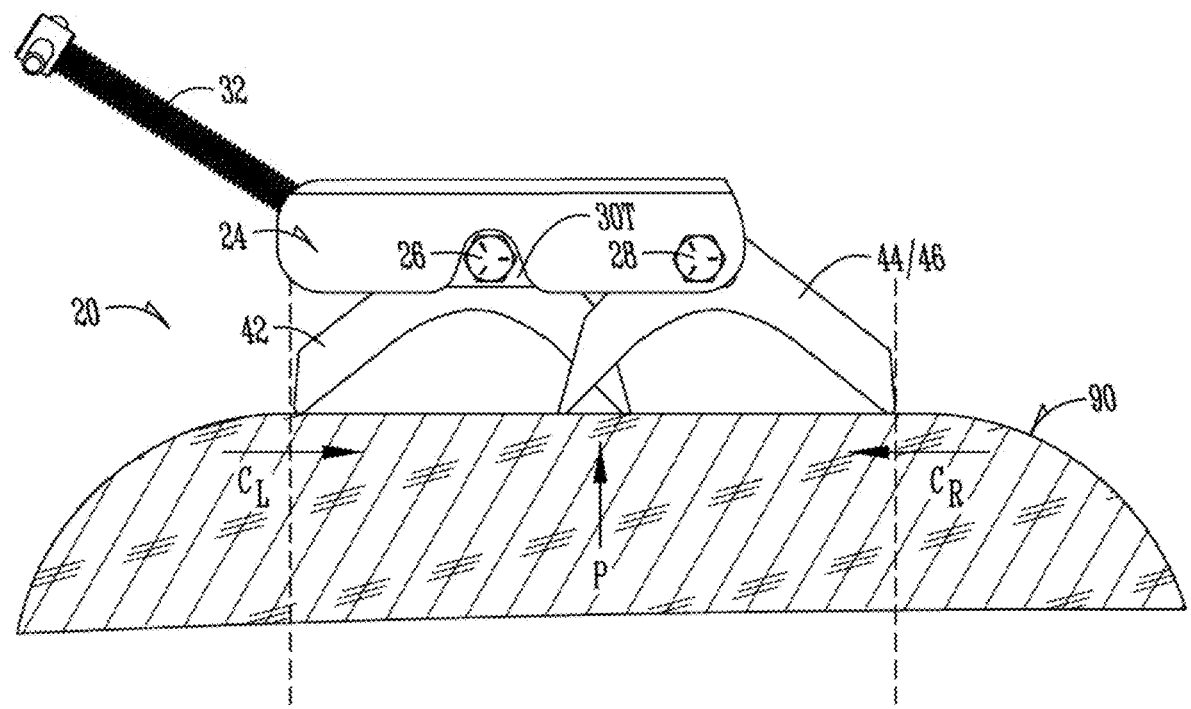
FIG. 5 is a top plan view of subassembly 20 of FIGS. 2A and B installed relative a tree trunk that is substantially wider in diameter than the opposite ends of claws 42/44/46 when fully extended.
Figure 6:
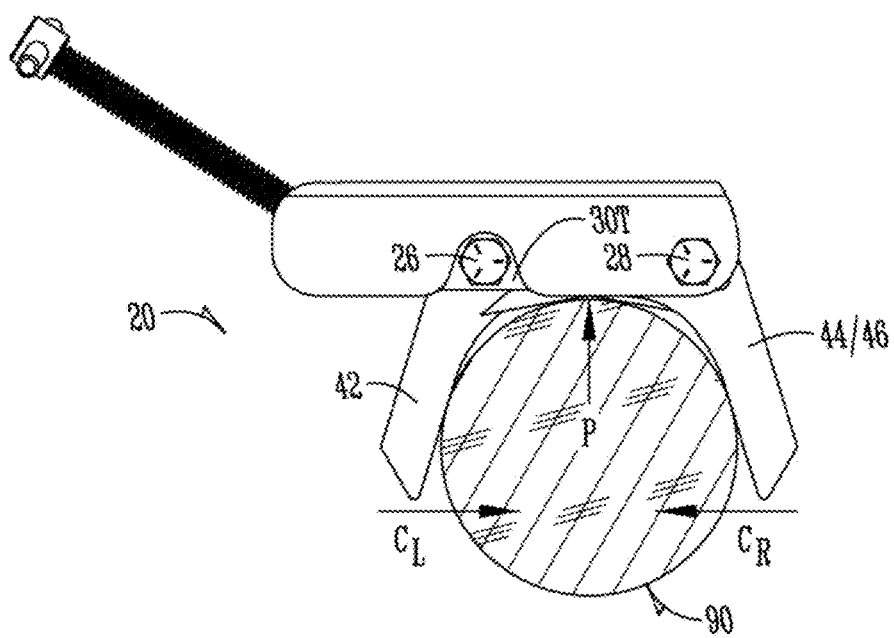
FIG. 6 is a top plan view of subassembly 20 of FIGS. 2A and B installed relative a tree trunk that is substantially narrower in diameter than the opposite ends of claws 42/44/46 when fully extended.

FIGS. 5 and 6 illustrate operation of this combination of claws 42, 44, 46. For some relatively large diameter tree trunks (FIG. 5), its facing mounting surface can be almost towards flat relative to the width of the claws. As shown in FIG. 5, the opposite pointed sides of each claw would abut such a trunk as overall assembly 10 (including claws 42, 44, 46) is preliminarily cinched in place with at least one strap assembly looped around the tree trunk (see FIG. 11B). Each of those points would automatically dig into the tree trunk at four locations. As the bracket 10 is further cinched to the trunk, those points would dig further.

In contrast, if the trunk diameter is much smaller, as in FIG. 6, the v- or c-shaped claw 42 and stacked claws 44/46 would automatically center the bracket 10 relative the trunk at their location. Pressure (see arrow P in FIG. 6) of the nearest point of trunk 90 against the inner edges of claws 42/44/46 would push on those portions of the claws. This would automatically cause jaw 42 to rotate counter-clockwise in FIG. 6 on axis 43, and jaws 44/46 to rotate clockwise on axis 31. This essentially automatically causes the opposite ends of jaw 42 versus jaws 44/46 to converge to produce converging clamping action on the left and right (see arrows CL and CR in FIG. 6) on the tree trunk. The tighter bracket 10 is cinched to the trunk, the more clamping pressure. Also, the edges of arm 42 and arm combination 44/46 at or near the center of the trunk will dig in there (opposite to pressure P arrow) to resist the bracket sliding in either direction around the trunk. The outer edges of 42 and 44/46 will dig in and clamp opposite sides of the trunk, also deterring sliding of bracket 10 around the trunk but also deter sliding along the trunk.

As can be appreciated, for different tree trunk form factors, the multiple claw configuration can assist in securing a grip of the trunk. It is difficult to twist a double-V shape. It digs into the trunk and resists sliding around, including with a seat and/or foot rest or other tree stand supporting a hunter, especially relative to crooked trees.

FIGS. 2C-H provide one non-limiting example of form factor for main cross beam or adjuster frame 24 (FIGS. 2C-F) and claw 42, 44, and 46 (FIGS. 2G-H). It is to be understood that these are non-limiting examples and that variations are possible.

Main cross beam 24 can be made of steel or other relatively robust and rigid metal. Aligned bores for pin 28 along pivot axis 31 can be drilled or otherwise formed. Aligned notches 25 allow pin 26 head and nut 29 to next but have freedom to move out when nested secondary beam 30 assembly is angularly pivoted out from nesting in beam 24 by threaded control 32.

Each claw 42, 44, and 46 can be basically identical, but it is not required. Here they are basically identical with the dimensional characteristics noted in FIG. 2H. This includes a compound inner edge having straight sections on opposite sides of a curved section with a radius of curvature. This arrangement produces the relatively sharp ends or points at the distal portions of edge sections, in combination with side edges that are at acute angles with these distal portions respectively. The convex shape of the edge of claws 42, 44, and 46 on the opposite side from inner edge allow each claw to pivot within main beam 24 when second beam 30 is nested therein.

4. Strap 50

As can be appreciated, pairs of eyelets 16 and 18, in any of a variety of forms, can be used to match up to hooks 56 and 58 at opposite ends of each web strap 50 used to cinch apparatus 10 to a tree trunk. Each strap has an adjustable length by virtue of a ratchet or other manually controllable mechanism 54 between strap portions 52 R and 52L. This is conventional as can be seen in U.S. Pat. No. 9,743,774. There can be at least one strap 50 for each pair of hooks 16/18. In this embodiment it can be beneficial to use two straps 50, one for upper pair of hooks 16T/18T and one for a bottom pair of hooks 16/18B.

Figure 1B:
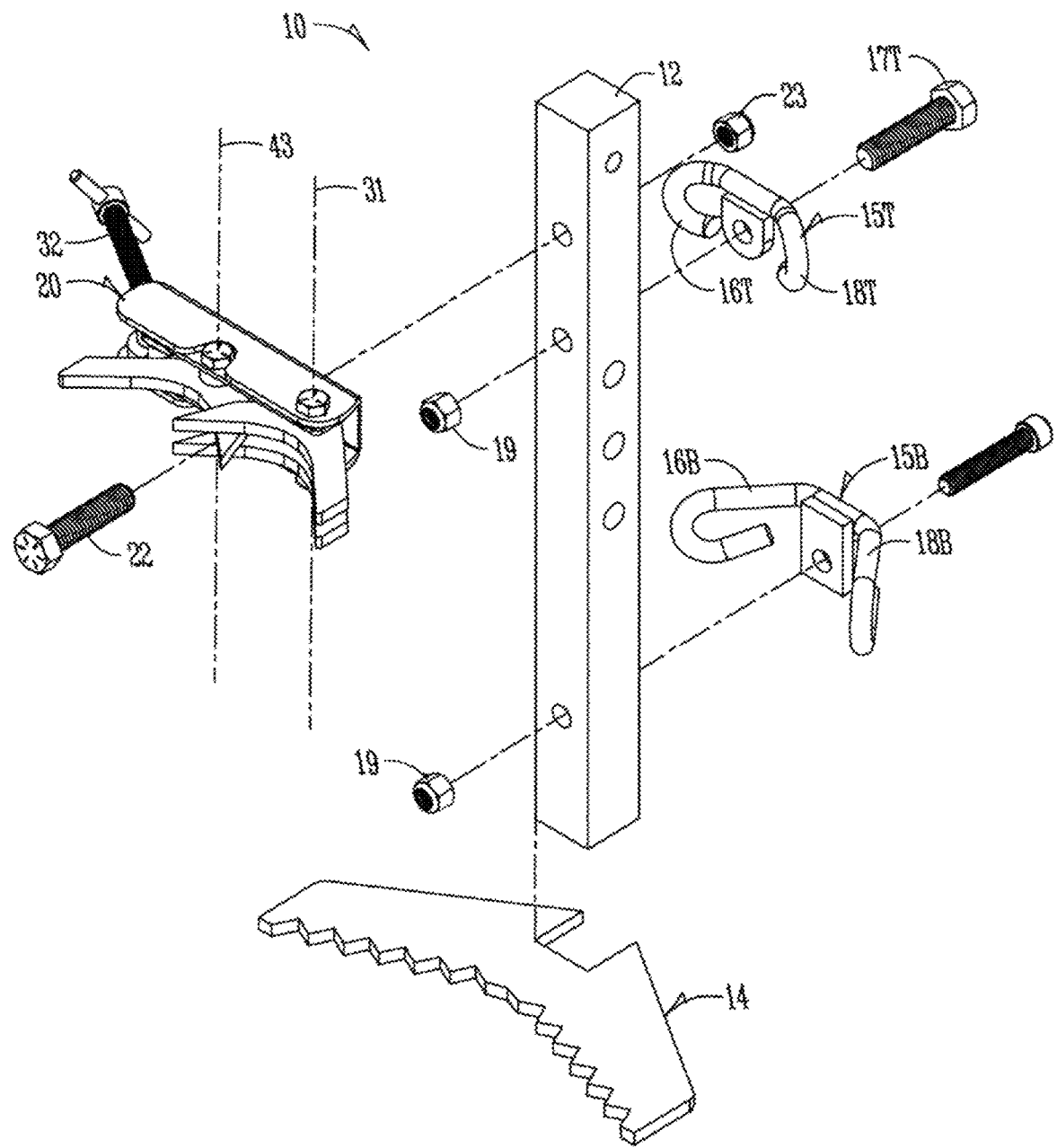
FIG. 1B is an exploded view of the embodiment of FIG. 1A without the strap assembly.

As shown in FIG. 1B, each pair of hooks 16/18 could be a part of a single dual-hook member 15 that could be fixed to backbone 12 by a pin 17 (e.g. ½-13 hex head cap screw and appropriate locknut.

C. Operation

FIGS. 3A-D show specifically the first degree of freedom of adjustment of primary beam assembly 20 relative to backbone 12, namely rotation around axis 21 with secondary beam assembly 30 and three claws 42,44,46. Compare beam assembly 20 at Y (horizontal) and 20' at Y' (rotated on angle a, about 30 degrees).

FIGS. 4A-D show in specifically a second possible degree freedom of adjustment at primary beam assembly 20, namely the pivoting of secondary beam assembly 30 around axis 31 with secondary beam assembly 30 carrying three claws 42/44/46. Just horizontal cross sections of trunk 90 at the locations of lower claw 14 and upper claws 42/44/46 are shown in FIG. 4C for clarity. Compare secondary beam 30 at X and 30' at X'.

FIGS. 5 and 6 show more specifically the pivoting of claw combination 40 (here three claws: namely claw 42 on one side; claw set 44/46 on the other) relative to secondary beam assembly 30 for different diameter tree trunks for another degree freedom of adjustment.

Figure 9:
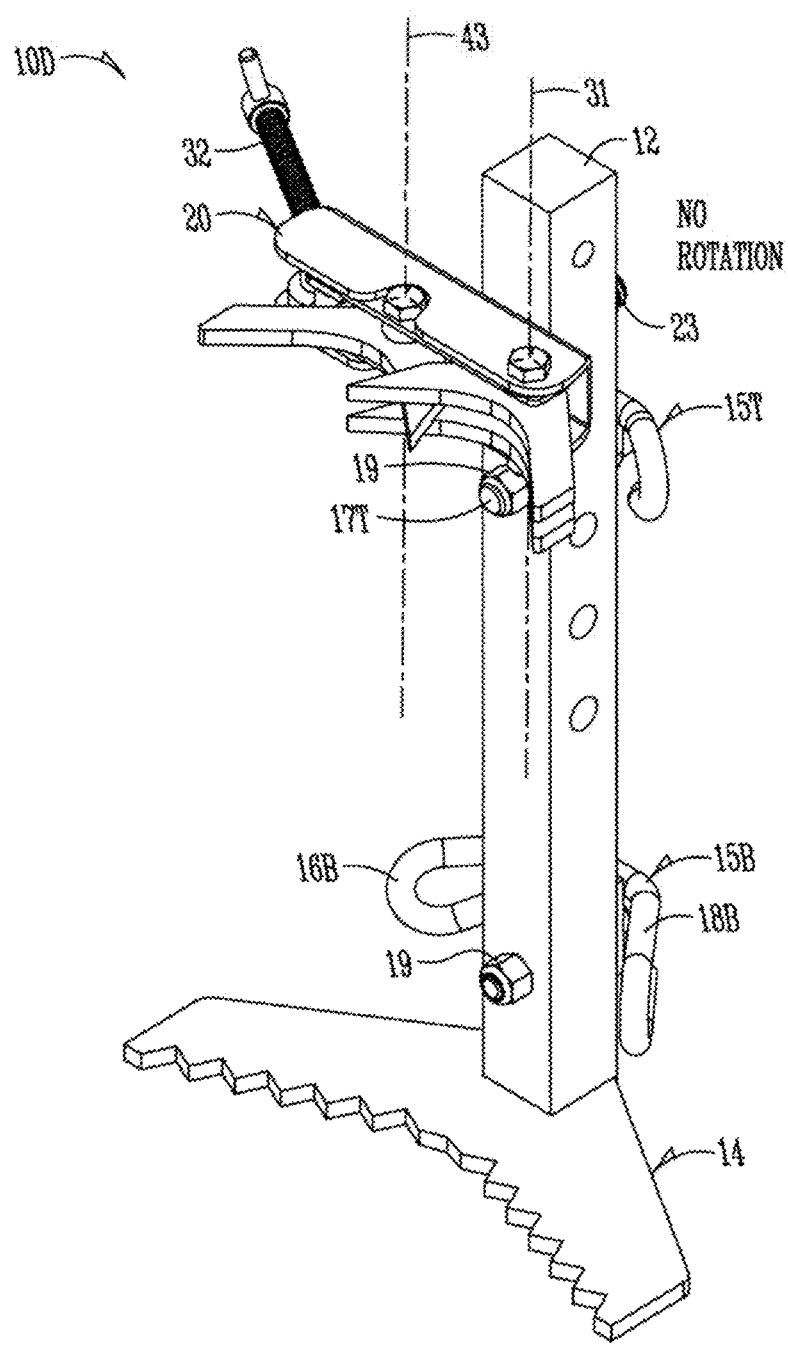
FIG. 9 is similar to FIG. 1A but shows an alternative embodiment according to the invention where just the adjuster frame 24 and claws 42/44/46 are utilized by the apparatus.

As discussed above, and as illustrated in FIG. 7, 8, or 9, respectively, any of these features can be used along with some type of backbone or support (see alternative embodiments 10B of FIG. 7, 10C of FIG. 8, and 10D of FIG. 9). Two could be combined. Or all three can be combined, as in FIGS. 2-4 and their sub-parts.

In each of FIGS. 2-4 (and sub-parts), a first position for each of those assemblies 20, 30, and 40 is shown in solid lines. An example of a second and different position is shown in dashed lines. As will be appreciated by those skilled in the art, the adjustment of each of those members can be any amount over a range that would be either unfettered or might be controlled by either the adjustment member such as the screw rod 32 for member 30, or mechanical limits of other structures as with member 40.

As will be appreciated, however, these multiple degrees of freedom of movement provide a vastly improved and variable way to compensate for different trunk form factors than a fixed upper claw or cleat alone.

As will be further appreciated, by reference to both U.S. Pat. No. 9,743,774 and the drawings herein, the components of embodiment 10 can be made to be robust to facilitate the needed strength, rigidity, and load bearing needed for such tree stands. This includes the addition of the multiple degree of freedom of movement adjustments.

For example, the primary channel piece or crossbeam 24 of cross beam assembly 20, the plates 30T and 30B of secondary beam assembly 30, primary claw 42, and secondary claw combination 42/44 can be made of metal, including steel of thickness and type to support at least several hundred pounds or more load from backbone 12 when mounted along a tree trunk. The pivot pins/cap screws, adjustment screw, and other hardware that allows relative movement can be designed to allow the same.

This does not mean, however, that other materials might not be used.

Again, as indicated above, any one of the features 20, 30, and 40 could be used with a backbone such as U.S. Pat. No. 9,743,774. Or they could be combined as any two features or all could be used together.

Figure 4D:
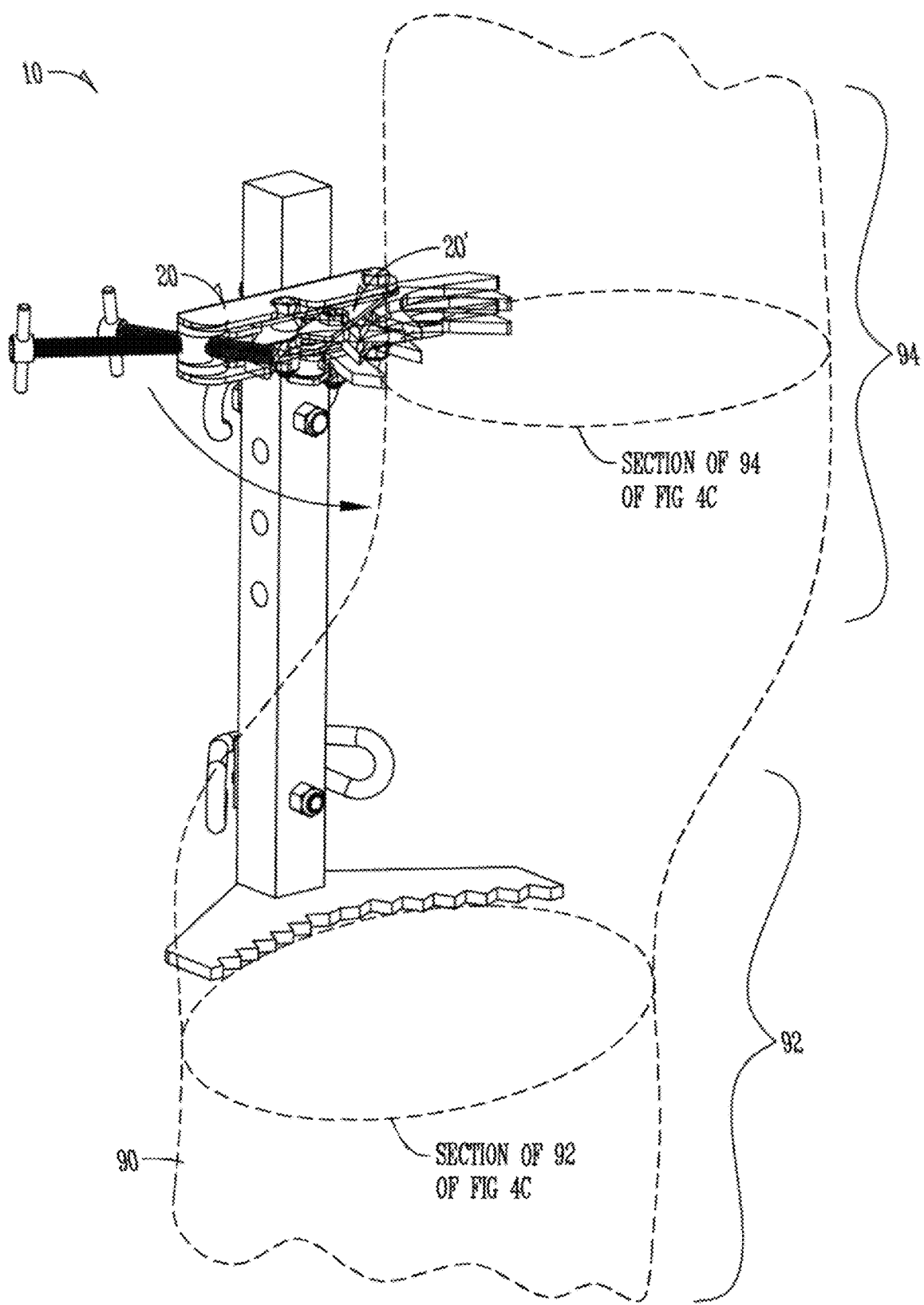

FIGS. 3C-D, 4C-D, 5 and 6 provide a working example of apparatus 10 on different tree trunks. As can be seen, the mounting location on the trunk in these figures presents the problem that the trunk going upward at angles both in the plane or rotation of main cross beam 20 (FIGS. 3C-D) and away from the backbone (FIGS. 4C-D). Of course, the trunk could have both of those issues, namely it could be crooked in more than one direction such as tilting away and sideways relative to backbone 12 when bottom cleat 14 is abutted to a lower place on the trunk and backbone is held generally vertical.

One example of how to operate bracket 10 is as follows:
(1) Bring bracket 10, which includes backbone 12, to a location selected along a tree trunk with backbone 12 basically vertical/plumb as much as possible by eye (or with a tool such as a level that is separate or built-in).
(2) Decide which side of the trunk you want the screw rod adjustment 32, and rotate beam 20 accordingly. Typically, the screw rod 32 would be placed on the side in which the tree trunk diverges from vertical. So, for example, screw rod 32 would be in the position shown in FIG. 1A if the tree trunk diverged from vertical in that direction.
(3) Wrap a first strap assembly 50 around the trunk and hook its hooks 56 and 58 to corresponding hooks 16 and 18B near bottom claw 14 towards the bottom of backbone 12 (see FIG. 11B) and use the ratchet adjustment 54 of that strap assembly 50 to preliminarily cinch the bottom of bracket 10 to the trunk. This sets bottom claw 14 into the trunk. The serrations or teeth of claw 14 help set it against movement along or around the trunk.
(4) The user could again check by eye or use tools such as one or more levels to plumb the backbone 12 relative to true vertical, if possible, or as close as possible and further cinch lower strap assembly in place if deemed needed.
(5) A second strap assembly 50 would be loosely looped (e.g. see FIG. 11B) around the trunk and its hooks 56 and 58 hooked to top hooks 16T and 18T towards the top of backbone 12.
(6) Then, if needed, primary beam assembly 20 would be rotated on axis 21 to compensate most closely with the axis of the trunk at that point. If the trunk is generally straight vertical, little or no beam assembly 20 rotation from horizontal would be needed. If the trunk leans to one side of backbone/vertical, beam assembly 20 could be rotated so that it is basically perpendicular across the trunk at that point (e.g. see FIGS. 3A-D). If configured to allow it, and the user desires, Nut 23 for capscrew 22 could be tightened to fix crossbeam assembly 20 in that rotational position. On the other hand, it might not be tightened.

(7) Then, the user can decide if adjustment of screw rod 32 is indicated. For crooked trunks that tilt away from backbone when lower cleat 14 is cinched in place, this allows another degree of freedom of adjustment of bracket 10 relative the trunk. As illustrated in FIGS. 4A-D, the user would maintain backbone 12 as plumb as possible and turn the handle of screw adjustment 32 to pivot secondary beam assembly 30 angularly outward to bring it towards the trunk. As discussed above, if the trunk tilts directly away from backbone 12, it matters little which side of backbone 12 the adjustment screw 32 is positioned. But if trunk both tilts laterally to one side as well as back away, the whole beam assembly 20 can be rotated on axis 21 for the best correspondence between secondary beam 30 pivot adjustment to the direction of the trunk tilt. While maintaining backbone 12 as plumb as possible, the user would then further operate cinching mechanism 54 of top strap assembly 52 to converge the one or more claws or cleats in secondary beam assembly 30 to the trunk. If three claws 42/44/46 are used, this will automatically cause adjacent tips of claws 42 and 44/46 to come into contact with the trunk at that location, and be pushed back towards secondary beam assembly 30 (see arrow P in FIG. 4C). This will bring opposite points of claws 42 and 44/46 convergingly towards the trunk.

(8) Claws 42 and 44/46 will automatically center bracket 10 to the trunk at that point, even if crooked, as well as adapt to its diameter. For larger diameters, points of the claws can be almost aligned along a plane (see FIG. 5). All six claw points would dig into the trunk and promote robust resistance against slippage along the trunk as well as around the trunk. Such six small points of contact and the forces P and CL and CR would work towards that end. For smaller diameters, the outer claw points converge and clamp the trunk. The inner edges of the claws and clamping forces CL and CR would work towards robust resistance against slippage along the trunk as well as round the trunk. The foregoing all works with the prior setting of lower claw 14 to the tree trunk at a spaced apart position lower on the trunk.

(9) The cinch strap 50 can be finally tightened as needed or desired.

(10) If further adjustments are needed, any of the foregoing can be readjusted. For example, the backbone 12 can again be checked for plumbness. If adjustment of screw 32 is needed, top strap assembly 50 could be quickly and easily loosened a bit, and screw 32 operated accordingly. Likewise, the rotational position of crossbeam assembly 30 could be changed. Top strap assembly 50 could then be re-tightened.

(11) It is to be understood that the foregoing could be done before any seat, foot platform, or other tree stand components are attached to bracket 10. In some cases, any such seat, foot rest or platform, or other tree stand could be connected to bracket 10, and together those components cinched to a tree trunk by the foregoing method steps.

It will be appreciated that by onboard level such as U.S. Pat. No. 9,743,774 or other leveling techniques, backbone 12 can be plumbed to vertical and one or more of features 20, 30, and 40 adjusted to keep it as close to plumb as possible even if the trunk has the form factor in those figures.

D. Options and Alternatives

It is to be appreciated that invention can take many forms and embodiments. Variations obvious to those skilled in the art will be included with the invention which is not limited to the specific embodiments disclosed herein.

As mentioned, all features 20, 30, and 40 can be used together. But each can be used alone.

For example, a single fixed claw (such as in U.S. Pat. No. 9,743,774) could be fixed in beam assembly 20 of, if used, secondary beam assembly 30, and used with backbone 12 (or other tree-mounting brackets) to allow one degree freedom of adjustment (rotation around axis 21). This alone can be beneficial.

By further example, a fixed beam assembly 20 (i.e. non-rotatable) could have adjustable secondary beam assembly 30 installed in it, with a single fixed claw in the secondary beam assembly 30. Just the ability to pivot the free end of secondary beam assembly 30 into nesting with main beam assembly 20, or away from beam assembly 20, can give a different degree freedom of adjustment that could be beneficial.

By further example, just the double-claw arrangement 40 could be mounted to a fixed beam assembly 20 or otherwise to a backbone 12 or other tree-mounting bracket. The action of the double pivoting side by side claws alone provides a still further and different degree freedom of adjustment, and which is automatic when the claws combination is cinched to the trunk.

But, then, any or all of the foregoing can be combined. Just rotating beam assembly 20 and nesting/adjustable secondary beam assembly 30 but without double-claws 40 is possible. As is just rotating beam assembly 20 and double claws 40 in it. Or just secondary beam assembly 30 to a fixed (non-rotating) beam assembly 20 or directly to backbone 12 or other mounting plus the double claws.

And, as indicated, all three freedom of adjustment options can be used together.

It is further noted that the shapes, materials, attachments, and adjustment techniques can vary from those illustrated in the Figures. For example, just two claws 42 and 44 (without claw 46) might work. The use of two stacked claws 44 and 46 can be beneficial to accommodate what can be significant torque at that side of the assembly 10 for more robustness. The pair 44 and 46 would take more twisting and weight than a single claw in that location.

In this example, the distance between rotational axes of claw 42 and claw pair 44/46 (e.g. distance between cap screws 26 and 28) is on the order of 4 inches. The proportions of the other components relative that distance are generally shown in the Figures. However, variations are of course possible according to desire or need. One specific example of dimensions of main crossbeam channel member 24 and claws 42, 44, and 46 are shown in FIGS. 2C-H. Variations are possible.

The use of a threaded T-handle rod 32 and appropriate nut and bearing to adjust beam 20 could vary.

The type of tree stand component mounted to bracket 10 can vary. A few examples are illustrated in FIGS. 10-13. More detail about each can be found at U.S. Pat. No. 9,743,774.

Figure 11A:
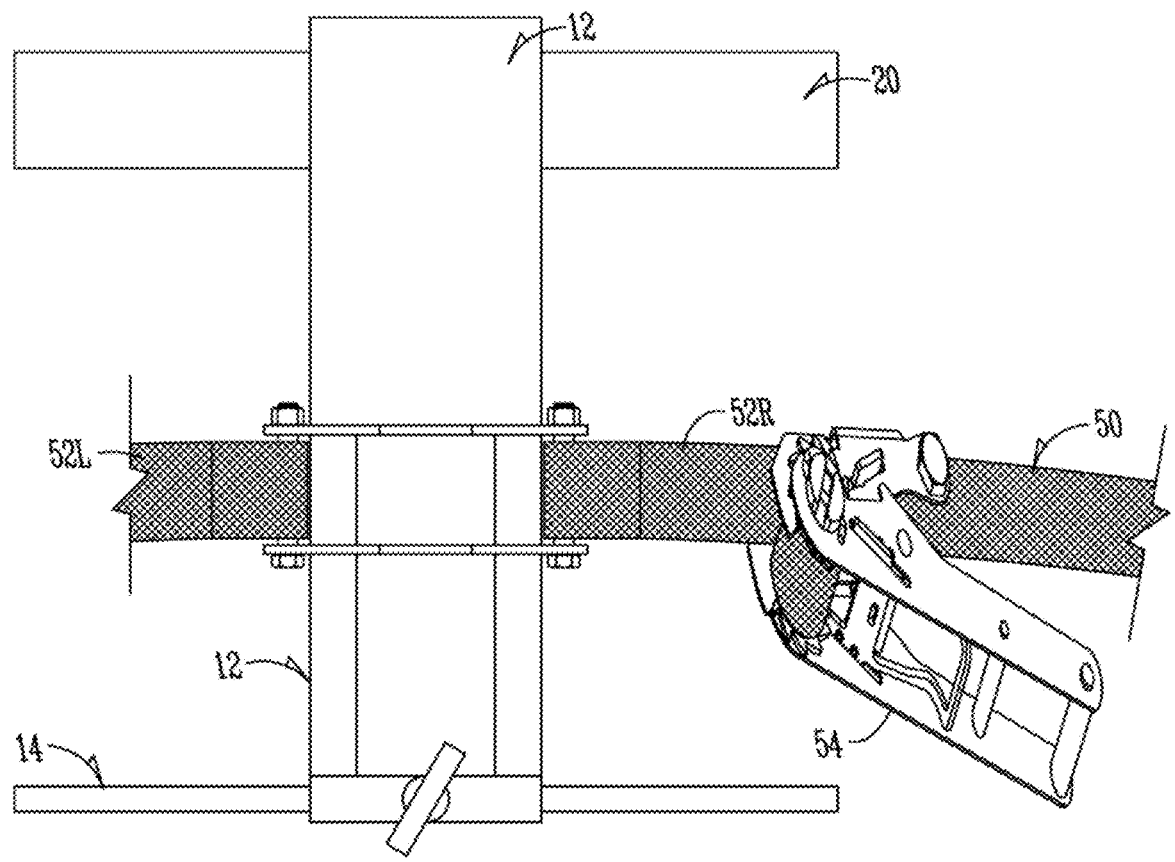
FIGS. 11A and B are an elevational and top plan views respectively of the apparatus of FIGS. 1A and B, including the seat of FIG. 10, with one cinching strap before cinched in place relative a tree trunk.
Figure 11B:
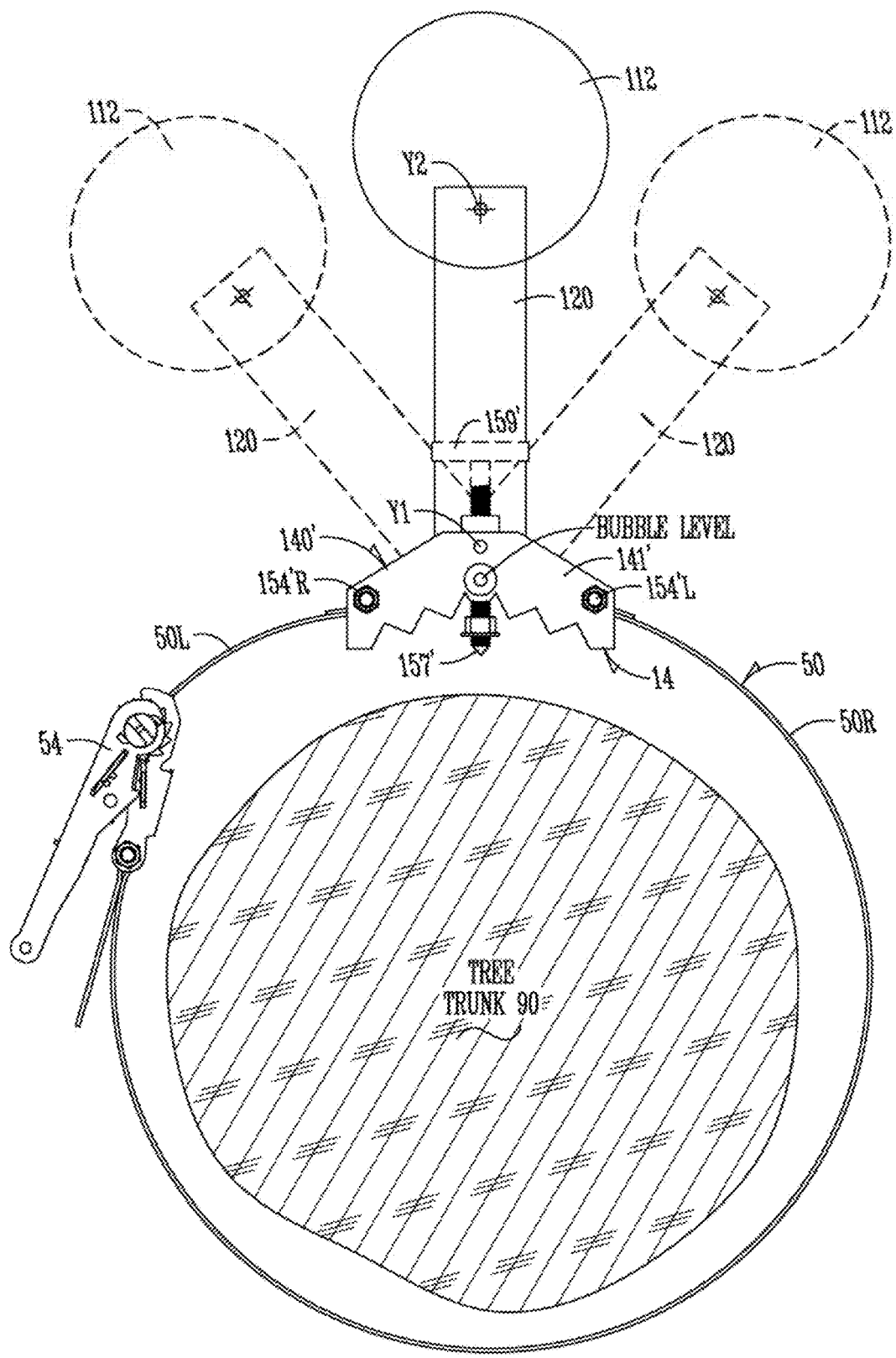

For example, the tree stand component could be seat 112 with is eccentrically rotatable on a cantilever arm 120 that is pivotable over a horizontal range (e.g. +/−30 degrees to either side from straight out) by pivotable connection to a bracket that can be mounted to backbone 12. A seat of this nature would benefit from bracket 10 of the present invention because it would allow secure positioning along a tree trunk such that cantilever arm 120 would be at least substantially horizontal. See U.S. Pat. No. 9,743,774. FIG. 11B shows one example of a cinching adjustment mechanism that could be used with strap assemblies 50. Others are possible. The method of mounting the tree stand component(s) can vary according to desire or need.

Figure 12:
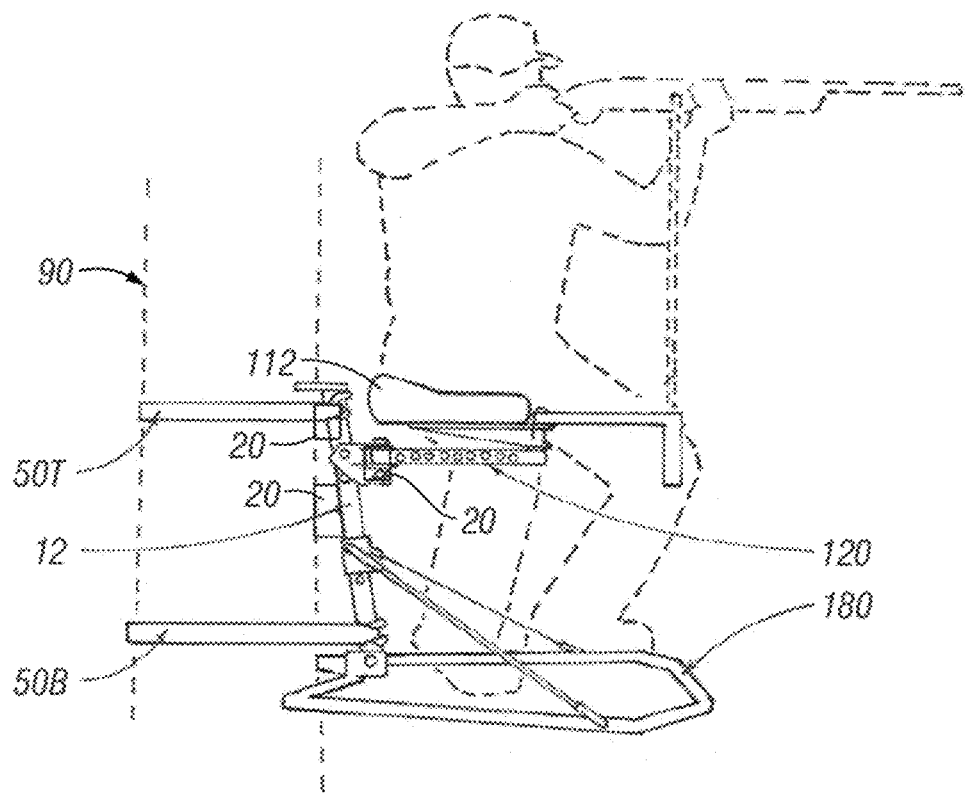
FIG. 12 is an elevation view of the apparatus of FIGS. 1A and B installed on a tree trunk in combination with the seat of FIG. 10 and a foot rest.

FIG. 12 illustrates how both a seat 112 and a foot rest 180 could be mounted to backbone 12 to support a seated hunter along a tree trunk. This shows how a substantial mass (bracket 10, seat 112, foot rest 180, and hunter and hunting accessories need to be supported along the tree trunk. The lower cleat 14 and the upper claw(s) 42 and/or 44 and/or 46 would operate with backbone and mounting straps 50 to do so. FIGS. 13A-C illustrate how a hunter could benefit from being able to quickly and smoothly change aiming orientations while remaining seated. This changes the strains on bracket 10 as the hunter changes position and accentuates the need for strong, stable, and slippage resistant mount to the tree trunk. The aspects of the present invention address these problems as well as the subtle problem of mounting to crooked tree trunks.

What is claimed is:

1. An apparatus adapted for cinching along a tree trunk to support another apparatus along a tree trunk comprising:
   a. a crossbeam assembly having opposite sides and ends along a longitudinal axis, a mounting location for mounting to another apparatus;
   b. first and second cleats each comprising:
      i. an elongated plate member having:
         1. a proximal edge closest to the cross beam assembly;
         2. a distal generally C- or V-shaped edge farthest from the cross beam assembly;
         3. opposite relatively pointed ends; and
         4. a pivot location between proximal and distal edges for the pivotal mounting to the cross beam assembly;
   c. the first cleat and a second cleat pivotally mounted at generally parallel first and second pivot axes spaced apart along the longitudinal axis between the opposite ends of the cross beam assembly with adjacent pointed ends overlapping but pivotable in different planes so that the adjacent pointed ends can overlap but can pass by each other when pivoting.

2. The apparatus of claim 1 further comprising a third cleat pivotally mounted to the cross beam assembly along the second pivot axis but spaced from the pivot location of the second cleat.

3. The apparatus of claim 1 wherein the mounting location comprises an aperture or connection on the cross beam assembly adapted for operative connection of the cross beam assembly to another apparatus.

4. The apparatus of claim 3 wherein the other apparatus comprises a backbone comprising:
   a. an elongated body with opposite sides and opposite ends;
   b. hooking locations to receive hooks at opposite ends of a cinching strap.

5. The apparatus of claim 4 further comprising a cleat member mounted to the body away from the mounting location of the cross beam assembly.

6. The apparatus of claim 3 wherein the other apparatus comprises one of:
   a. a tree stand mount;
   b. a tree stand;
   c. a seat assembly;
   d. a platform assembly for standing;
   e. a ladder;
   f. a tripod; and
   g. a combination of two or more of the foregoing.

7. The apparatus of claim 1 wherein the cross beam assembly comprises a beam or channel having opposite ends.

8. The apparatus of claim 1 wherein the cross beam assembly comprises:
   a. a main beam or channel having opposite ends and including the mounting location for mounting another apparatus;
   b. a secondary beam having opposite ends and including the pivotally mounted first and second cleats;
   c. a connection between the main beam or channel and the secondary beam allowing selectively adjustment of the secondary beam and the first and second cleats over a range from a position along the main beam or channel to a position away from the main beam or channel.

9. The apparatus of claim 8 wherein the connection comprises:
   a. a pivot connection between adjacent opposite ends of the main crossbeam and the secondary cross beam; and
   b. a manual adjustment control between adjacent other opposite ends of the main crossbeam and the secondary crossbeam;
   c. so that the selective adjustment is angular between the secondary crossbeam and the main crossbeam.

10. The apparatus of claim 1 wherein the mounting location for the crossbeam assembly comprises:
    a. a pivot member allowing rotation of the crossbeam assembly around the mounting location;
    b. to allow adjustment of orientation of the first and second claws in a plane parallel to the longitudinal axis of the crossbeam assembly.

11. An apparatus adapted for cinching along a tree trunk to support another apparatus along a tree trunk comprising:
    a. a backbone having opposite sides and ends along a longitudinal axis and a first cleat-mounting position spaced apart along the longitudinal axis between the opposite ends;
    b. an adjustable cleat assembly mounted to the backbone at the first cleat mounting position, the adjustable cleat assembly including:
       i. a crossbeam having a longitudinal axis;
       ii. at least one cleat mounted to and extending outwardly relative to the crossbeam with a distal trunk-abutting edge;
       iii. a mechanism for at least one degree freedom of movement of the at least one cleat relative to the backbone;
       iv. wherein the at least one cleat of the adjustable cleat assembly comprises a first cleat independently pivotally mounted to the crossbeam towards the middle of the first cleat at a first cleat pivot axis generally perpendicular to the longitudinal axis of the crossbeam, and a second cleat independently pivotally mounted to the crossbeam towards the middle of the second cleat at a second cleat pivot axis laterally spaced along the crossbeam from the first pivot axis;
    c. wherein the independent and spaced apart pivoting of the first and second cleats promotes automatic adjustment, self-centering, and gripping of the apparatus to a tree trunk.

12. The apparatus of claim 11 further comprising a cleat member mounted to the backbone at a second cleat mounting location spaced from the first cleat mounting location.

13. The apparatus of claim 12 wherein the backbone comprises an elongated member along the longitudinal axis with cinch-mechanism assembly connections at or near each of the first and second cleat-mounting positions and a tree stand mounting location between the first and second cleat-mounting positions.

14. The apparatus of claim 11 wherein the another apparatus comprises at least one of:
   a. a tree stand;
   b. a seat;
   c. a foot stand;
   d. a ladder; and
   e. another backbone.

15. The apparatus of claim 11 wherein the at least one degree freedom of movement relative the backbone comprises a rotational connection between the backbone and the adjustable cleat assembly which allows rotation of the adjustable cleat assembly around a rotational axis transverse to the longitudinal axis of the backbone, wherein the rotational mount allows rotation of the adjustable cleat assembly around the rotational axis of over 180 degrees and the rotational mount allows one of:
   a. free rotation; and
   b. selective rotation and releasably fixing in a selected rotational position.

16. The apparatus of claim 11 wherein the at least one degree freedom of movement relative the backbone comprises movement of the at least one cleat of the adjustable cleat assembly over a range away from the backbone, wherein the adjustable cleat assembly comprises:
   a. the crossbeam mounted to the backbone;
   b. a secondary cross beam mounted to the crossbeam, wherein the at least one cleat is mounted in the secondary cross beam;
   c. a pivot connection between the secondary cross beam and the cross beam;
   d. a manually adjustable mechanism connected between the crossbeam and the secondary cross beam to angularly move the secondary crossbeam around the pivot connection over an angular range away from the crossbeam.

17. The apparatus of claim 11 wherein each of the at least one cleat comprises:
   a. an elongated plate member having:
      i. a proximal edge closest to the base;
      ii. a distal generally C- or V-shaped edge farthest from the base;
      iii. opposite relatively pointed ends; and
   b. a pivot location between proximal and distal edges for the pivotal mounting; and
   c. wherein adjacent said opposite relatively pointed ends of the first and second cleats overlap one another but pivot in different plane.

18. The apparatus of claim 17 further comprising a third cleat pivotally mounted to but spaced along the pivot axis of the second cleat.

* * * * *